(12) United States Patent
Itoh et al.

(10) Patent No.: US 7,792,893 B2
(45) Date of Patent: Sep. 7, 2010

(54) DEVICE AND METHOD FOR CALCULATING CONVERSION PARAMETER OF MONTGOMERY MODULAR MULTIPLICATION AND PROGRAM THEREFOR

(75) Inventors: Kouichi Itoh, Kawasaki (JP); Masahiko Takenaka, Kawasaki (JP); Naoya Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1245 days.

(21) Appl. No.: 11/230,592

(22) Filed: Sep. 21, 2005

(65) Prior Publication Data

US 2006/0235921 A1 Oct. 19, 2006

Related U.S. Application Data

(63) Continuation of application No. PCT/JP03/09722, filed on Jul. 31, 2003.

(51) Int. Cl.
*G06F 7/38* (2006.01)
*G06F 7/00* (2006.01)

(52) U.S. Cl. ..................... 708/492; 708/491
(58) Field of Classification Search ......... 708/490–492, 708/620–656
See application file for complete search history.

(56) References Cited

U.S. PATENT DOCUMENTS

| 5,666,419 | A | | 9/1997 | Yamamoto et al. | |
|---|---|---|---|---|---|
| 5,745,398 | A | * | 4/1998 | Monier | 708/492 |
| 5,751,620 | A | * | 5/1998 | Monier | 708/492 |
| 5,764,554 | A | * | 6/1998 | Monier | 708/491 |
| 5,777,916 | A | * | 7/1998 | Monier | 708/530 |
| 5,912,904 | A | * | 6/1999 | Monier | 714/781 |
| 6,230,178 | B1 | * | 5/2001 | Pomet | 708/491 |
| 6,240,436 | B1 | * | 5/2001 | McGregor | 708/491 |
| 7,278,090 | B2 | * | 10/2007 | Harmon | 714/808 |
| 7,694,045 | B2 | * | 4/2010 | Thomas et al. | 710/58 |

(Continued)

FOREIGN PATENT DOCUMENTS

EP 0 712 070 5/1996

(Continued)

OTHER PUBLICATIONS

Eric W. Weisstein, "CRC Concise Encyclopedia of Mathematics, Second Edition", Chapman & Hall/CRC, Dec. 2002, p. 982.*

(Continued)

*Primary Examiner*—Chat C Do
*Assistant Examiner*—Matthew Sandifer
(74) *Attorney, Agent, or Firm*—Staas & Halsey LLP

(57) ABSTRACT

A method for calculating a conversion parameter of the Montgomery modular multiplication to improve the efficiency of software installation, comprising a first step for calculating $H_0 = 2^v \times R \pmod n$ (where v is an integer, $v \geq 1$, and $(m \times k)/v$ is an integer), a second step for calculating $H_p = 2^{v \times 2^p} \times R \pmod n$ from $H_0 = 2^v \times R \pmod n$ by repeating $H_i = REDC(H_{i-1}, H_{i-1})_n$ with respect to $i=1, 2, \ldots, p$ (where p represents an integer satisfying the condition $2^p \geq (m \times k)/v > 2^{p-1}$, REDC represents the Montgomery modular multiplication $REDC(a, b)_n = a \times b \times R^{-1} \pmod n$, and $x^i$ represents exponential computation $x^i$); and a third step for calculating $H_p = R^2 \pmod n$ by calculating $H_p = REDC(H_p, g)_n$ with respect to $H_p$ obtained in the second step when $2^p > (m \times k)/v$ (where $g = 2^{k \times E(p,m,k)}$, $E(p, m, k) = 2 \times m - (v \times 2^p)/k$) and finally outputting $H_p$ as $R^2 \pmod n$.

4 Claims, 15 Drawing Sheets

U.S. PATENT DOCUMENTS

2007/0260664 A1* 11/2007 Bertoni et al. .............. 708/490

FOREIGN PATENT DOCUMENTS

| | | |
|---|---|---|
| EP | 0 712 072 | 5/1996 |
| EP | 0 785 503 | 7/1997 |
| EP | 0 947 915 | 10/1999 |
| JP | 7-152319 | 6/1995 |
| JP | 7-199807 | 8/1995 |
| JP | 8-263316 | 10/1996 |
| JP | 8-339310 | 12/1996 |
| JP | 11-305995 | 11/1999 |
| JP | 2002-7112 | 1/2002 |

OTHER PUBLICATIONS

Charles Absug, "Tutorial: Representation of Numbers in Digital Computers, and Digital Integer Arithmetic", 1999, p. 11, retrieved from James Madison University, https://users.cs.jmu.edu/abzugcx/public/Computer-Organization-GRADUATE/Tutorial-on-D igital-Integer-Arithmetic.doc.*

Eldridge, S.E.; Walter, C.D.; , "Hardware implementation of Montgomery's modular multiplication algorithm," IEEE Transactions on Computers, vol. 42, No. 6, pp. 693-699, Jun. 1993.*

Supplementary European Search Report issued Jun. 21, 2007 in corresponding European Patent Application No. 03817774.7.

Keiichi Iwamura et al., The Transactions of the Institute of Electronics, Information and Communication Engineers, vol. 76, No. 8, Aug. 25, 1993, pp. 1214 to 1223.

* cited by examiner

RELATED ART input: $a = (a_{m-1}, ..., a_1, a_0)$, $b = (b_{m-1}, ..., b_1, b_0)$, $n = (n_{m-1}, ..., n_1, n_0)$,
$nd_0 = -n^{-1} \pmod{2^k}$
output: $y = (y_m, y_{m-1}, ..., y_1, y_0)$ $(y_{m-1}, ..., y_1, y_0)_w = (0, ..., 0, 0)$
for j:=0 to m−1
    $(t2, t1) := y_0 + a_0 \times b_j$
    $u := t1 \times nd_0 \pmod{2^k}$
    $(t4, t1) := t1 + u \times nd_0$
    $(c1, c0) := t2 + t1$
    for i:=1 to m−1
        $(t3, t2, t1) := y_i + (c1, c0) + a_i \times b_j$
        $(t1, y_i) := t1 + u \times n_i$
        $(c1, c0) := t4 + (t3, t2)$
    next i
    $(c1, c0) := (c1, c0) + y_m$
    $y_{m-1} := c0$
    $y_m := c1$
next j
if $(y \geq n)$ then $y := y - n$
return y

*Fig. 1*

RELATED ART

```
input: a, d, n        where d = ∑_{i=0}^{v-1} 2^i d_i  (d_i=0,1)
output: y = a^d (mod n)

1: y:=1
2: H = R^2 (mod n)                              Montgomery conversion
                                                parameter calculation 3: a':=REDC(a, H)_n, y':=REDC(y, H)_n           Montgomery conversion
4: for i:=0 to v-1
5:    if (d_i=1) y' := REDC(y', a')_n           Montgomery modular multiplication
6:    a' := REDC(a', a')_n                      Montgomery modular multiplication
7: next i
8: y := REDC(y', 1)_n                           Montgomery inverse conversion
9: return y
```

Fig. 2

```
input: x, n
output: H = R^2 (mod n), where R=2^x (mod n)

1: H=R (mod n)
2: for i:=0 to x-1
3:    H := H + H
4:    if (H ≧ n) then H := H - n
5: next i
6: return H
```

RELATED ART

Fig. 3

RELATED ART

RELATED ART

· Case where the highest-order bit of n' is equal to 1

| 0  | 00000000 | 00000000 | 00000000 | 00000000 |
| n' | 10011011 | 00101110 | 10110110 | 11001100 |

| 0 - n' | 01100100 | 11010001 | 01001001 | 00110100 | ⬅ Value necessarily less than n'.

Because the computation result of 0 - n' is within the range of remainder values (0 or higher to less than n'), R (mod n') = 0 - n' is established.

· Case where the highest-order bit of n' is equal to 0

| 0  | 00000000 | 00000000 | 00000000 | 00000000 |
| n' | 01111011 | 00101110 | 10110110 | 11001100 |

| 0 - n' | 10000100 | 11010001 | 01001001 | 00110100 | ⬅ Value necessarily exceeding n' (highest-order bit = 1)

Because the computation result of 0 - n' exceeds n', the result R (mod n') = 0 - n' is not obtained.

*Fig. 7*

RELATED ART

The below-described operation is repeated for $i = p' - 2, \ldots, 1, 0$ from $H_0 = 2^v \times R \pmod{n}$.
As a result, $H_{p'-1} = R^2 \pmod{n}$ is obtained. Here, $p'$ is a bit length of $(m \times k)/v$.

- if the i-th bit value of $(m \times k)/v$ is 0,
  $H_i = \text{REDC}(H_{i-1}, H_{i-1})_n$ is conducted.
- if the i-th bit value of $(m \times k)/v$ is 1,
  the calculation of $H_i = \text{REDC}(H_{i-1}, H_{i-1})_n$
  and $H_i = \text{REDC}(H_i, H_0)_n$ is conducted.

if bit value = 0, only the operation of raising to the power of two is conducted.

if bit value = 1, the operations of raising to the power of two + multiplication are conducted.

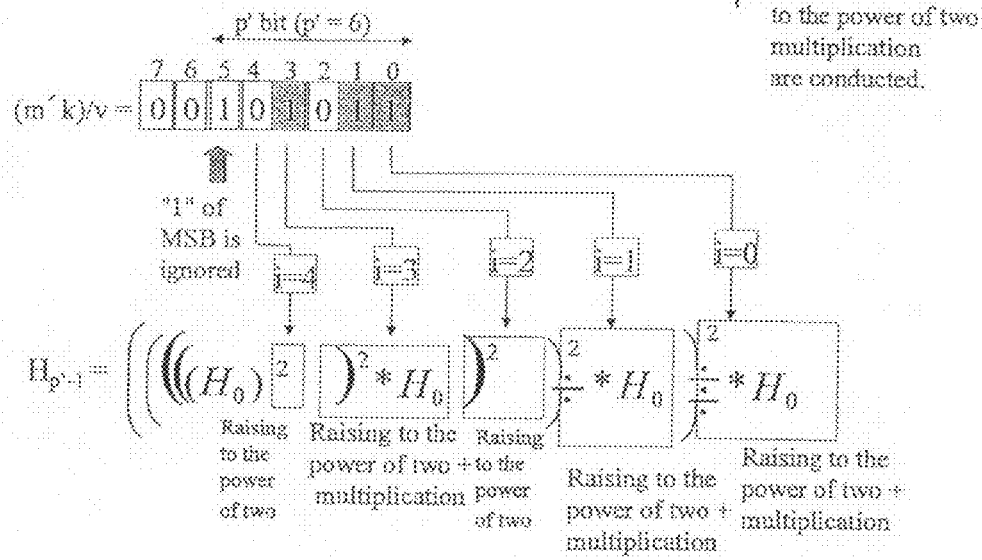

The following two operations are necessary to obtain the correct result $H_{p'-1} = R^2 \pmod{n}$:
- Calculation of the most significant bit (MSB) of $(m \times k)/v$ (Problem 4).
- Detection of each bit value of $(m \times k)/v$ (Problem 5).

Fig. 8

- Initial values are set, REG1 = n and REG2 = $2^{(m-1) \times k}$ are assumed.

REG1(=n)　　　|00111011| |00101110| |10110110| |11001101|

REG2(=$2^{(m-1) \cdot k}$)|00000001| |00000000| |00000000| |00000000|

- REG2 = $2^{m \times k}$ (mod n) = R (mod n) is obtained by repeating k times the below-described modular squaring.
  (the highest-order bit of n being equal to 1 is not a mandatory condition for calculating R (mod n))
  - REG2 is shifted 1 bit to the left.
  - If REG2 ≥ REG1, REG2 := REG2 − REG1 is calculated.

- REG2 = $2^v \times$ R (mod n) is obtained by further repeating v times the modular squaring.
  - REG2 is shifted 1 bit to the left.
  - If REG2 ≥ REG1, REG2 := REG2 − REG1 is calculated.

---

REG2 = $2^v \times$ R (mod n) is calculated by repeating k + v times the modular squaring computation with respect to REG2 = $2^{(m-1) \times k}$. ⇒
Calculation of the MSB of n is not necessary!

The below-described operation is repeated with respect to $i = 0, 1, \ldots,$
$b - 1$ from $H_0 = 2^v \times R \pmod{n}$, $H' = R \pmod{n}$ and $H' = R^2 \pmod{n}$ is obtained.
Here, b is a constant representing the maximum bit length of $(m \times k)/v$.

- If the i-th bit value of $(m \times k)/v$ is $= 0$,
  $H_i = \text{REDC}(H_{i-1}, H_{i-1})_n$ is conducted.
- If the i-th bit value of $(m \times k)/v$ is 1,
  the calculation of $H' = \text{REDC}(H', H_{i-1})_n$ and
  $H_i = \text{REDC}(H_{i-1}, H_{i-1})_n$ is conducted.

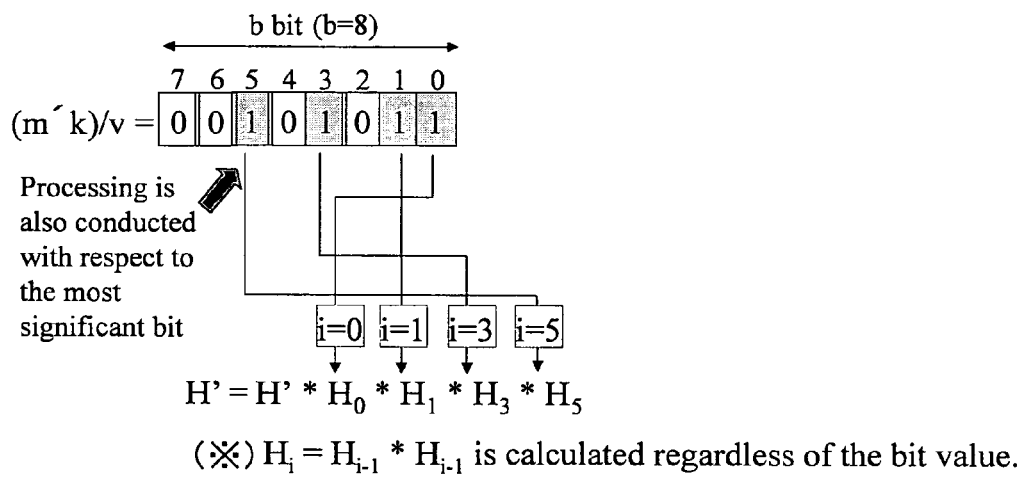

(※) $H_i = H_{i-1} * H_{i-1}$ is calculated regardless of the bit value.

Calculation of the most significant bit (MSB) of $(m \times k)/v$ is not required,
⇒ Problem 4 is resolved.

Fig. 10

501. The value of n is given to REG1 and $2^{(m-1) \times k}$ is given to REG2. Here, the effective word length of n is m.

502. $H_0 = 2^{m \times k + v}$ (mod n) is calculated by repeating k + v times the below-described operation. Here, v is an integer, v ≥ 1, and (m × k)/v is an integer.
 • REG2 is shifted 1 bit to the left.
 • If REG2 ≥ REG1, REG2 := REG2 − REG1 is calculated
   (REG2 := 2 × REG2 (mod n)).

503. REG2 = $2^{E(p'',m,k)}$ (mod n) is calculated by repeating the operation REG2 := REDC(REG2, REG2)$_n$ with respect to i = 1, 2, ..., p''.
Here, p'' is an integer satisfying the condition $2^{p''} \geq$ (m × k)/v > $2^{p''}$-1.
E(p'', m, k) = m × k + v × $2^{p''}$. REDC(A, B)$_n$ represents the Montgomery modular multiplication REDC(A, B)$_n$ = 2-m×k × A × B (mod n).

504. If $2^{p''}$ > (m × k)/v, the below-described correction computation is conducted.
 • REG2 := REDC(REG2, g)$_n$, where g = $2^{k \times G(p'',m,k)}$ and
   G(p'', m, k) = 2 × m − v × ($2^{p''}$)/k.

The result REG2 = $R^2$ (mod n) is outputted and the processing is completed.

Fig. 13

DEVICE AND METHOD FOR CALCULATING CONVERSION PARAMETER OF MONTGOMERY MODULAR MULTIPLICATION AND PROGRAM THEREFOR

This is a continuation of International Application PCT/JP2003/009722, with an international filing date of Jul. 31, 2003.

BACKGROUND OF THE INVENTION

The present invention relates to the field of information security, particularly, relates to a calculation technology for conducting modular exponentiation in high-speed

DESCRIPTION OF RELATED ART

Services using information networks such as digital money and network system for Basic Resident Registers are expected to expand following future growth of the information-oriented society. Information security technology is required to ensure that those services can be employed safely, and cryptography is used as the fundamental technology of information security. Using the cryptography makes it possible to realize functions such as encryption, digital signing, and validation and prevent individual information from improper access by a third party.

A variety of cryptographic systems are known for realizing the cryptographic technology, and they can be generally classified into two groups: a common key cryptosystem and a public key cryptosystem. The system called a common key cryptosystem uses the same key (private key) for encryption and decryption and ensures safety by employing this private key as information unknown to a third party other than the sender and receiver. With the public key cryptosystem, different keys are used for encryption and decryption and safety is ensured by employing a key (individual key) for decrypting the encrypted text as private information known only to the sender, rather than employing a generally known key (public key) for encryption.

When the common key cryptosystem is used, the aforementioned private key has to be commonly had by the sender and receiver in a safe form unknown to a third party. The advantage of the public key cryptosystem over the common key cryptosystem is that private information is not required to be known to both the sender and the receiver, but the demerit is that the calculation amount necessary for processing is much higher than that in the common key cryptography system. For this reason, increasing the speed of calculation in the public key cryptography system is an important problem.

RSA and elliptic curve cryptosystem are known as typical methods of the public key cryptography. The processing employed in RSA uses modular exponentiation computation and that of public key cryptography uses a computation called scalar multiplication of points. In both those computation methods, multiplication modular computation, in which $y=a \times b \pmod n$ ($0 \leq a, b < n$) is calculated from integers a, b, and n, is used as the basic computation. However, when the multiplication remainder computation is directly installed on hardware or software, the processing time is long and processing efficiency is poor. For this reason, the calculation is generally conducted by using a computation method called Montgomery modular multiplication in place of the multiplication modular processing.

The Montgomery modular multiplication is a computation method in which y represented in the form of $y = a \times b \times R^{-1}$ (mod n) is calculated from integers a, b, n. Here, $R=2^{m \times k}$, k is a bit length per 1 word, and m is an effective word length of n. Using the Montgomery modular multiplication makes it possible to realize processing that is faster than the usual multiplication modular processing. The algorithm of Montgomery modular multiplication is shown in FIG. 1. Here, $x=(x_{m-1}, \ldots, x_1, x_0)$ indicates a format of representing the integer value x by using m word values $x_i$ ($i=m-1, \ldots, 1, 0$, $0 \leq x_i < 2^k$).

As described hereinabove, the computation carried out with the Montgomery modular multiplication is $a \times b \times R^{-1}$ (mod n) and is different from the usual multiplication remainder computation $a \times b \pmod n$. Therefore, in order to execute the modular exponentiation computation correctly, input data given to Montgomery modular multiplication has to be converted to data called a Montgomery system. If any input data given to the usual multiplication modular computation is represented by x, data obtained by converting x to the Montgomery system is represented by x', the conversion from x to x' (Montgomery conversion) is represented by $x'=\text{Mont}(x)$, and the conversion from x' to x (Montgomery inverse conversion) is represented by $x=\text{Mont}^{-1}(x')$, then those conversions can be given by the following formulas.

Montgomery conversion: $x'=\text{Mont}(x)=x \times R \pmod n$

Montgomery inverse conversion: $x=\text{Mont}^{-1}(x')=x' \times R^{-1} \pmod n$ When the Montgomery modular multiplication is denoted by $y=\text{REDC}(a, b)_n = a \times b \times R^{-1} \pmod n$, the Montgomery conversion and Montgomery inverse conversion can be represented as follows by using REDC. Here, H is a value represented by $H=R^2 \pmod n$ and is the value found by the preceding calculation (H is referred to hereinbelow as Montgomery conversion parameter).

Montgomery conversion: $x'=\text{REDC}(x, H)_n = x \times R^2 \times R^{-1} = x \times R \pmod n$.

(where $H=R^2 \pmod n$)

Montgomery inverse conversion: $x=\text{REDC}(x', 1)_n = x' \times 1 \times R^{-1} = x' \times R^{-1} \pmod n$.

An algorithm of modular exponentiation processing using the Montgomery modular multiplication and based on the above-discussed approach is shown in FIG. 2.

FIG. 2 shows an algorithm using the Montgomery modular multiplication based on a modular exponentiation calculation method that is called a binary method. With this algorithm, the modular exponentiation calculation results $y=a^d \pmod n$ are calculated from the input values a, d, n. In the 1st line, 1 is given as an initial value of y. In the 2nd line, the Montgomery conversion parameter $H=R^2 \pmod n$ is calculated, and then, in the 3rd line, the Montgomery conversion is carried out with respect to a and y and a' and y' are obtained. In the loop of the 4th to 7th lines, the processing of repeating the Montgomery modular multiplication once or twice with respect to the bit value of d is repeated from the lowest-order bit to the highest-order bit of d. The final calculation result y is obtained by conducting the Montgomery inverse conversion in the 8th line with respect to the y' calculated in this loop.

A method of repeating the operations of addition and subtraction from the integers a, b, n is the basic self-evident calculation method for calculating $H=R^2 \pmod n$. When $R=2^x$, H can be calculated by the algorithm shown in FIG. 3.

The algorithm shown in FIG. 3 will be explained below.

In the 1st line, R (mod n) is calculated. R (mod n) can be calculated by a variety of methods. For example, when the effective bit length of n is x with respect to $R=2^x$, the calculation can be conducted in an easy manner by R (mod n)=0−n.

In the $3^{rd}$ to $5^{th}$ lines, H+H is calculated with respect to H=R (mod n). Then, if the result is n or higher, the modular addition (modular squaring) of H+H (mod n) is conducted by subtracting the n. Furthermore, the calculation of H+H can be also implemented by a left 1 bit shift computation. $R \times 2^x$ (mod n)=$R^2$ (mod n) is computed by repeating this modular addition computation x times.

However, the drawback of the algorithm shown in FIG. 3 is that because the modular addition is repeated x times in the $3^{rd}$ to $5^{th}$ lines, the processing speed is low. For example, in the RSA computation in the case of n being 1024 bits, $R=2^{1024}$, but the modular addition has to be conducted 1024 times and the calculation amount is huge.

A variety of calculation methods have been suggested to resolve this problem, those methods including the below-described Conventional Method 1 (for example, Document D1 to D4) and Conventional Method 2 (for example, Document D5).

The specific feature of both methods is that the speed of the entire computation is increased by combining REDC computation, shifting, and subtraction rather than by conducting calculation by using only shifting and subtraction.

The Conventional Method 1 and Conventional Method 2 will be described below in a simple manner.

Here, k stands for a bit length per 1 word, n is a value represented by m word values, and the number of consecutive "0" from the highest order of n is denoted by q. For example, when k=8, if the bit row of n is 00101011 11001111, then m=2 and q=2, and if the bit row of n is 10001001 11100110 11100101, m=3 and q=0.

<Conventional Method 1>

The Conventional Method 1 mainly includes the following Step $A_1$ and Step $B_1$.

Here the input is n (residue modulo) and the output is $R^2$ (mod n) (where $R=2^{m \times k}$ (mod n)).

Step $A_1$: $H_0=2^v \times R$ (mod n) is computed by using shifting and subtraction ($v \geq 1$).

Step $B_1$: $H=R^2$ (mod n) is computed from $H_0$ by using the REDC computation.

The flowcharts of Step $A_1$ and Step $B_1$ of Conventional Method 1 are shown in FIG. 4.

In FIG. 4, in step 101, REG1 :=n, REG2 :=0 are given as the initial values in the two registers REG1, REG2. The effective word length of n is m, and the number of consecutive "0" from the highest-order bit in the case of storing in the REG1, with n being justified to the right, is denoted by q.

In step 102, 1 bit shift to the left is repeated q times with respect to REG1 to obtain REG1=n'=$2^q \times n$.

In step 103, REG2 :=REG2−REG1 is computed and REG2=$2^{m \times k}$ (mod n') is obtained.

In step 104, the below described processing is repeated v+q times and REG2=$2^{m \times k+v+q}$ is obtained. Here, v is an integer such that $v \geq 1$ and (m×k)/v becomes a power of 2 with respect to m, k.

① REG2 is shifted 1 bit to the left.

② If REG2≧REG1, REG2 :=REG2−REG1 is calculated.

In step 105, REG1=n, REG2=$H_0=2^{m \times k+v}$ (mod n) are obtained by repeating q times the 1 bit right shift processing with respect to REG1 and REG2.

In step 106, H=REG2=$2^{2 \times m \times k}=R^2$ (mod n) is calculated by repeating p times the REG2 :=REDC(REG2, REG2)$_n$, the calculation results are outputted, and the calculation process is completed. Here, p is an integer satisfying the condition $p=\log_2((m \times k)/v)$ and REDC(A, B)$_n$ represents the Montgomery modular multiplication REDC(A, B)$_n=A \times B \times 2^{-m \times k}$ (mod n).

The numbers of computation cycles necessary for the Conventional Method 1 are shown in Table 1 below. In the table, SFT represents a 1 bit shift, SUB—subtraction, and REDC—Montgomery modular multiplication computation.

TABLE 1

Numbers of computation cycles necessary for Conventional Method 1

|  | 101 | 102 | 103 | 104 | 105 | 106 | Total |
|---|---|---|---|---|---|---|---|
| SFT | 0 | q | 0 | q + v | 2q | 0 | 4q + v |
| SUB | 0 | 0 | 1 | 0.5(q + v) | 0 | 0 | 0.5(q + v) + 1 |
| REDC | 0 | 0 | 0 | 0 | 0 | p | p | p in step 106 is an integer satisfying the condition $p=\log_2((m \times k)/v)$. For this condition to be satisfied, (m×k)/v has to be represented as (m×k)/v=$2^x$ by using integer x, that is, as a value of 2 raised to a power. In Conventional Method 1, the selection of values of v is restricted by this condition. Therefore, the value of v has to be increased by the effective bit length of n. The drawback of the method, as follows from table 1, is that because the number of computation cycles of SFT and SUB is proportional to v, raising the v increases the entire calculation amount.

The numbers of computation cycles are presented below with respect to specific code processing as examples.

EXAMPLE 1

1024-bit RSA Encryption

In this case n is 1024 bits. If 1 word=32 bits, then k=32 and the effective word length of n is m=32. Because k*m obtained by multiplying the bit length k per one word and the effective word length m of n coincides with the total bit value of n, the highest-order bit of n is equal to 1 and q=0. Furthermore, because m×k=1024, v=1, 2, 4, . . . , 1024 can be selected. When v=1, SFT is 1 cycle, SUB is 1.5 cycles, and REDC is $p=\log_2((32 \times 32)/1)=10$ cycles.

EXAMPLE 2

163-Bit Elliptic Curve Encryption

In this case n is 163 bits. If 1 word=8 bits, then k=8 and the effective word length of n is m=21. If n is represented by bit length k=8 and effective word length m=21, then m*k−163=21×8−163=5 bits in the highest-order position becomes 0 and q=5. Furthermore, because m×k=168, v=21, 42, 84, 168 can be selected. When v=21, SFT is 4×5+21=41 cycles, SUB is 0.5×(5+21)+1=14 cycles, and REDC is $p=\log_2((21 \times 8)/21)=3$ cycles.

<Conventional Method 2>

The Conventional Method 2 mainly includes the following Step $A_2$ and Step $B_2$.

Here, the input is n (residue modulo) and the output is $R^2$ (mod n) (where $R=2^{m \times k}$ (mod n)).

Step $A_2$: $H_0=2^v \times R$ (mod n) is calculated. The method for calculating $2^v \times R$ (mod n) is not specified in Patent Reference 5, but the method for calculating $2^v \times R$ (mod n) described in Conventional Method 1 is considered as an example of suitable methods.

Step $B_2$: $H=R^2$ (mod n) is computed from $H_0$ by using the REDC computation. This is done by detecting each bit value of m×k in the succession from the highest-order bit to the lowest-order bit and repeating the REDC computation once or twice correspondingly to "0" or "1".

The flowcharts of Step $A_2$ and Step $B_2$ are shown in FIG. 5. The method for calculating $2^v \times R$ (mod n) in Step $A_2$ is described with respect to the case where a method identical to that of Step $A_1$ of Conventional Method 1 was used.

In FIG. 5, in step 201, REG1 :=n, REG2 :=0 are given as the initial values for the two registers REG1, REG2. The effective word length of n is m, and the number of consecutive "0" from the highest-order bit in the case of storing in the REG1, with n being justified to the right, is denoted by q.

In step 201, 1 bit shift to the left is repeated q times with respect to REG1 to obtain REG1=n'=$2^q \times$n.

In step 202, REG2 :=REG1−REG2 is computed and REG2=$2^{m \times k}$ (mod n') is obtained.

In step 203, the below described processing is repeated q+v times and REG2=$2^{m \times k + v + q}$ (mod n') is obtained.
① REG2 is shifted 1 bit to the left.
② If REG2≧REG1, REG2 :=REG1−REG2 is calculated.

In step 204, REG1 and REG2 are shifted q times to the right, REG2 is copied to REG0, and REG1=n, REG0=REG2=$2^{m \times k + v}$ (mod n) are obtained; v is an integer, v≧1, and (m×k)/v is an integer.

In step 201, REG2=$2^{2 \times m \times k}$=$R^2$ (mod n) is calculated by repeating p'−1 times the below-described processing with respect to i=p'−2, . . . 1, 0, the calculation results are outputted, and the calculation process is completed. Here, p' represents the bit length of (m×k)/v and REDC(A, B)$_n$ represents the Montgomery modular multiplication REDC(A, B)$_n$=A×B× $2^{-m \times k}$ (mod n).
③ REG2 :=REDC(REG2, REG2)$_n$ is calculated.
④ If the i-th bit value of (m×k)/v is 1, the REG2 :=REDC (REG2, REG0)$_n$ is calculated.

In order to conduct the processing of the above-described Conventional Method 1, p=$\log_2$(m×k)/v has to be an integer. Thus, the processing is restricted by the (m×k)/v being a power of 2. In order to satisfy this restriction, m, k, v have to be set by the below-described two stages (i), (ii).

(i) m, k are determined from the bit length of n and bit length per 1 word.

(ii) the value of v is set so that (m×k)/v becomes a power of 2 with respect to m, k determined in (i).

Thus, setting is done so that (m×k)/v assumes a value which is a power of 2 by adjusting the value of v in (ii) with respect to the values of m, k uniquely determined from the bit length of n and bit length per 1 word in the processor in (i). The problem is that when the value of v is adjusted in (ii), if the value of v increases because of the limitation requiring the (m×k)/v to assume a value which is a power of 2, the calculation amount of the entire calculation processing of parameter H sometimes increases. For example, this problem can be understood by comparing the number of cycles of shifting and subtracting in the above-described Example 1 and Example 2. In Example 1, the value of v can be set to a very small value of v=1, 2, 4, . . . , but in Example 2, large values of v=21, 42, . . . have to be set. According to Table 1, the total number of shifting and subtracting cycles in the entire calculation process is proportional to v multiplied by a factor of 1.5. In other words, the total number of shifting and subtracting cycles increases 30 times when v=21 by comparison with the case of v=1.

By contrast, in Conventional Method 2, processing can be conducted if (m×k)/v is an integer. Therefore, the value of v can be set in a wider range of conditions than in Conventional Method 1, and the parameter H can be calculated at a smaller calculation amount than with Conventional Method 1 by setting the optimum value of v.

The numbers of computation cycles necessary for Conventional Method 2 are shown in Table 2. Here, SFT represent a 1-bit shift, SUB—subtraction, and REDC—Montgomery modular multiplication computation. W(x) represents the number of "1", with the exception of the highest-order bit and is the number of cycles of REDC computation in the case where the bit value of (m×k)/v in step 206 is 1. For example, W(($10000)_2$)=0, W(($1000101)_2$)=2. Here, ( . . . )$_2$ is a symbol denoting binary representation. For example, $(1101)_2$=13 and $(11100)_2$=28.

TABLE 2

| | \multicolumn{7}{c}{Numbers of computation cycles necessary for Conventional Method 2} |
|---|---|---|---|---|---|---|---|
| | 201 | 202 | 203 | 204 | 205 | 206 | Total |
| SFT | 0 | q | 0 | q + v | 2q | 0 | 4q + v |
| SUB | 0 | 0 | 1 | 0.5(q + v) | 0 | 0 | 0.5(q + v) + 1 |
| REDC | 0 | 0 | 0 | 0 | 0 | p'· 1 + W((m × k)/v) (p'· 1~2(p'· 1)) | p'· 1 + W((m × k)/v) (p'· 1~2(p'· 1)) |

The numbers of computation cycles are presented below with respect to specific code processing as examples.

EXAMPLE 1

1024-bit RSA Encryption

In this case n is 1024 bits. If 1 word=32 bits, then k=32 and the effective word length of n is m=32. Similarly to the above-described, because k*m bit coincides with the total bit value of n, the highest-order bit of n is equal to 1 and q=0. Furthermore, because m×k=1024, v can be selected from any factor of 1024. When v=1, SFT is 1 cycle, SUB is 1.5 cycles, and REDC is p=$\log_2$((32×32)/1)=10 cycles.

EXAMPLE 4

163-Bit Elliptic Curve Encryption

In this case n is 163 bits. If 1 word=8 bits, then k=8 and the effective word length of n is m=21. In this case, too, as described hereinabove, when n is justified to the right to k*m bit, the highest-order 21×8·163=5 bit becomes 0 and q=5. Furthermore because m×k=168, v can be selected from any factor of 168. When v=21, SFT is 4×5+21=41 cycles, SUB is 0.5×(5+21)+1=14 cycles, and for REDC, p'−1+W ((m×k)/v)=4−1+0=3 from (m×k)/v=$(1000)_2$, when v=1, SFT is 4×5+1=21, SUB is 0.5×(5+1)+1=4, and for REDC, p'−1+W((m×k)/v)=8−1+2=9 from (m×k)/v=

$(10101000)_2$. When v=21, the calculation amounts are identical to those of Example 2 of Conventional Method 1, but when v=1, SFT is 41−21=20 cycles, SUB is 14−4=10 cycles, and a total reduction of 30 cycles is possible. REDC is increased by 9−3=6 cycles, but when the REDC computation is carried out at a high speed with a special hardware such as a coprocessor, the calculation can be done within about the same time as SUB or SFT. Therefore, v=1 makes it possible to realize a faster processing.

[Document D1]
Japanese Patent Application Laid-open No. H08-263316.
  (Patent Family: U.S. Pat. No. 5,745,398, EP No. 712,071)
[Document D2]
Japanese Patent Application Laid-open No. H08-339310.
  (Patent Family: U.S. Pat. No. 5,751,620, EP No. 712,070)
[Document D3]
Japanese Patent Application Laid-open No. H11-305995.
  (Patent Family: U.S. Pat. No. 6,240,436)
[Document D4]
U.S. Pat. No. 5,912,904
  (Patent Family: EP 0601907A2)
[Document D5]
U.S. Pat. No. 5,777,916
  (Patent Family: EP 785,503)

With the above-described Conventional Method 1 and Conventional Method 2, problems are associated with the limitation placed on parameter v, computation of the most significant bit (referred to hereinbelow as MSB) of the data value, and detection of the data bit value, as described in Problem 1 to Problem 5 hereinbelow. The computation of MSB and detection of bit values require operational processing in bit units, but those have poor processing efficiency in software installation.

① Problems Associated with Conventional Method 1
(Problem 1) The MSB of n has to be computed to compute q.
(Problem 2) There is a limitation of (m×k)/v being a power of 2.
② Problems Associated with Conventional Method 2
(Problem 3) When Conventional Method 1 is used for calculating $2^v \times R$ (mod n), the MSB of n has to be computed.
(Problem 4) The MSB of (m×k)/v has to be computed to compute p'.
(Problem 5) Each of (m×k)/v bit values has to be detected to repeat the REDC computation.

The cause of problem 1 and Problem 3 is in Step $A_1$ and Step $A_2$, respectively. In other words, in those processing operations, shifting is repeated for the REG1, REG2, but the problem arises because the number of times the shifting is repeated depends on the value of q.

The mechanism according to which this problem occurs will be described based on FIG. 6 illustrating processing of Step $A_1$ of the conventional method. Because Step $A_1$ and Step $A_2$ involve the same processing, the processing of Step $A_2$ is also represented by FIG. 6.

In the processing of FIG. 6, the processing involving the below-described Step $A_{1,1}$, Step $A_{1,2}$, Step $A_{1,3}$, and Step $A_{1,4}$ is conducted to calculate $2^v \times R$ (mod n).
Step $A_{1,1}$: $n'=2^q \times n$ is calculated (here, the highest-order bit=1 when n' is represented by m words).
Step $A_{1,2}$: R (mod n')=0−n' is calculated.
Step $A_{1,3}$: $2^{q+v} \times R$ (mod n') is calculated from R (mod n').
Step $A_{1,4}$: $2^v \times R$ (mod n) is calculated from $2^{q+v} \times R$ (mod n').

In the above-described Step $A_{1,2}$, the highest-order bit of m word value n' has to be 1 to calculate R (mod n') by 0−n'. As a result, the entire Step A requires the number of shift processing cycles corresponding to q. The processing contents of Step $A_{1,1}$ to Step $A_{1,4}$ will be described below in greater detail to illustrate why the shift cycle number depends on q.

In Step $A_{1,1}$, REG1=$n'=n \times 2^q$ is calculated by conducting q bit shifts to the left with respect to REG1=n. As a result, when the highest-order bit of REG1 represented by m word is not 1, the highest-order bit is made equal to 1 by using the left shift computation. Making the highest-order bit equal to 1 enables the modular computation indicated by R (mod n') in Step $A_{1,2}$ to be conducted by a simple calculation indicated by R (mod n')=0−n'.

In Step $A_{1,2}$, the calculation of REG2 :=0−n' is conducted with the object of computing REG2=R (mod n').

As shown in FIG. 7, when the highest-order bit of n' is 1 and the value obtained by deducting the highest-order bit is 1 or more, the highest-order bit in the computation results of 0−n' necessarily becomes 0. Therefore, it is clear that 0≦0−n'<n' and fits into the range of modular values based on (mod n'). However, when the highest-order bit of n' is 0, because the highest-order bit of 0−n' is necessarily 1, it is clear that 0−n'≧n' and exceeds the range of modular values. Therefore, in computation based on m words, the 0−n' computation result is $0-n'=2^{m \times k}-n'=R-n'$, but the value of the highest-order bit of n' represented by m words has to be 1 so that the value of R−n' becomes R (mod n') which is the target.

In Step $A_{1,3}$, REG2=$2^{q \times v} \times R$ (mod n') is calculated by repeating q+v times the modular squaring computing with respect to REG2=R (mod n') obtained in Step $A_{1,2}$. The double remainder computation has to be repeated q+v times to obtain $2^v \times R$ (mod n) in Step $A_{1,4}$ from the value of this REG2.

In Step $A_{1,4}$, the values of REG2, REG1 are corrected and REG2=$2^v \times R$ (mod n), which is the target value, is obtained by repeating q times the right 1 bit shift with respect to REG2=$2^{q \times v} \times R$ and REG1=$n'=n \times 2^q$. Finding y satisfying y=a (mod n) by the formula y=x/z where x satisfies x=a×z (mod n×z) is used for correcting the REG2 values.

As described hereinabove, processing of the entire Step A requires the shift processing to be repeated the number of times depending on q because m word values n' for which the highest-order bit=1 are created to conduct modular computation based on R (mod n')=0−n' in Step $A_{1,2}$.

The processing of Step $B_1$ is the cause of Problem 2. In this processing, after $H_0 = 2^v \times R$ (mod n) has been calculated, $H_p = R^2$ (mod n) is obtained by repeating p times the REDC computation in the manner as follows: $H_1 = \text{REDC}(H_0, H_0) = (2^v \times R) \times (2^v \times R) \times R^{-1} = 2^{2v} R$ (mod n), $H_2 = \text{REDC}(H_1, H_1)_n = (2^{2v} \times R) \times (2^{2v} \times R) \times R^{-1} = 2^{4v} R$ (mod n), . . . , $H_i = \text{REDC}(H_{i-1}, H_{i-1})_n = (2^{2^i \times v}) \times R$ (mod n), . . . . Here, 2^x represents x power of 2. As a result, it is necessary that $2^{2^p \times v} = R = 2^{m \times k}$ so that the calculated $H_p$ becomes $H_p = (2^{2^p \times v}) \times R$ (mod n)=$R^2$ (mod n). Therefore, $2^p$=(m×k)/v becomes the condition for computation. Thus, a limitation of (m×k)/v being a power of 2 is produced.

Problem 4 and Problem 5 are caused by the calculation procedure used in Step $B_2$ of the Conventional Method 2.

In Step $B_2$, as shown in FIG. 8, the i-th bit value of (m×k)/v is determined in the sequence of i=p'−2 . . . , 1, 0 by using $H_0 = 2^v \times R$ (mod n), and $H_{p'-1} = R^2$ (mod n) is calculated by repeating $H_i = \text{REDC}(H_{i-1}, H_{i-1})_n$ if the bit value is equal to 0 and repeating $H_i = \text{REDC}(H_{i-1}, H_{i-1})_n$, $H_i = \text{REDC}(H_i, H_0)_n$ if the bit value is equal to 1. Here, p' is the effective bit length of (m×k)/v.

Therefore, in order to obtain the correct result in Step $B_2$, two processing operations are required: computation of MSB of (m×k)/v for finding p' and detection of each bit value of (m×k)/v. As a result, Problem 4 and Problem 5 are respectively created.

SUMMARY OF THE INVENTION

<Resolution Method 1>

The present invention resolves the above-described problems; Problem 1 and Problem 3 are avoided by using the below described Resolution Method 1. With this Resolution Method 1, the processing of calculating $2^v \times R$ (mod n) is realized independently of q by carrying out the modular computation relating to R by using a method different from that of the conventional methods.

The processing of Resolution Method 1 is shown in FIG. 9. This processing will be described below. With Resolution Method 1, an initial value $2^{(m-1) \times k}$ is assigned to REG2 to calculate R (mod n) and $2^{m \times k}$ (mod n) is obtained by repeating the modular squaring computation k times with respect to this initial value. The initial value $2^{(m-1) \times k}$ can be readily generated by assigning 1 to the (m−1)-th word value and assigning 0 to other word values. $2^v \times R$ (mod n) can be obtained by further conducting the modular squaring computation v times with respect to the R (mod n) thus obtained. Those double remainder computations can be conducted by a total of k+v modular squaring computations. Because this method makes it possible to execute the processing regardless of the q value, it is not necessary to compute the MSB of n.

<Resolution Method 2>

Furthermore, in accordance with the present invention, Resolution Method 2 is suggested as means for resolving the above-described Problem 2.

Here, the condition relating to p is changed from $2^p=(m \times k)/v$ to a wider condition of $2^p \geq (m \times k)/v > 2^{p-1}$ by employing a correction computation using REDC. $H_0=2^v \times R$ (mod n) is computed by using shifting and subtraction and, similarly to Conventional Method 1, squaring multiplications using REDC: $H_1=REDC(H_0, H_0)$, $H_2=REDC(H_1, H_1)_n$, ..., $H_i=REDC(H_{i-1}, H_{i-1})_n$ ... are repeated p times. As a result, $H_p=(2^{2^p \times v}) \times R$ (mod n) is computed. Similarly to the conventional methods, when $2^p \neq (m \times k)/v$, that is, when $2^p > (m \times k)/v > 2^{p-1}$, the equation $H_p=(2^{2^p \times v}) \times R$ (mod n)=$R^2$ (mod n) is not valid, but $H_p=R^2$ (mod n) is obtained by conducting correction computation represented by $H_p=REDC(H_p, g)_n$ with respect to this $H_p$. Here, g that satisfies this condition is represented by $g=2^{k \times G(p, m, k)}$ and is given by $G(p, m, k)=2 \times m-(v \times 2^p)/k$. When $2^p > (m \times k)/v > 2^{p-1}$, $G(p, m, k)$ has a property of assuming an integer value satisfying the condition $1 \leq G(p, m, k) \leq m-1$. Therefore, the value of g can be readily generated by assuming that the word value of the $G(p, m, k)-1$ order is 1 and other word values are 0. The possibility of calculating $R^2$ (mod n) by using the above-described correction computation can be confirmed by $H_p=REDC(H_p, g)=(2^{2^p \times v} \times R) \times (2^{2k \times G(p,m,k)}) \times R^{-1}$ (mod n)=$(2^{2^p \times v}) \times (2^{2 \times m \times k - v \times 2^p})$ (mod n)=$2^{2 \times m \times k}$ (mod m)=$R^2$ (mod n). Furthermore, when this Resolution Method 2 is used, Problem 5 can be also resolved because the bit value detection of (m×k)/v is not necessary in repeated REDC computation.

<Resolution Method 3>

The above-described Problem 4 can be resolved by using the Resolution Method 3 in accordance with the present invention. Processing conducted according to Resolution Method 3 is illustrated by FIG. 10.

Here, the operations of detecting the i-th bit values of (m×k)/v in the order of i=0, 1, ..., b−1 are repeated and H'=$R^2$ (mod n) is calculated by assuming that $H_i=REDC(H_i, H_i)_n$ if the bit value is 0 and assuming that H'=REDC(H', $H_0$), $H_i=REDC(H_{i-1}, H_{i-1})$ if the bit value is 1.

In Step $B_2$ of the conventional method, the detection of bit values was conducted in the order of high-order bit→low-order bit, whereas in the Resolution Method 3, it is conducted in the order of low-order bit→high-order bit. Here, H'=R (mod n) and $H_0=2^v \times R$ (mod n) and b is a constant representing the maximum bit length of (m×k)/v.

Thus, following the procedure of Resolution Method 3, calculation may be conducted only with respect to "0", "1" of each bit value of (m×k)/v and processing is conducted which does not depend on the effective bit length of (m×k)/v. Therefore, Problem 4 can be resolved. Furthermore, because the limitation of (m×k)/v being a power of 2 is not imposed, Problem 2 can be resolved at the same time.

The present invention suggests a method for computing a conversion parameter of Montgomery modular multiplication that can resolve Problems 1 to 5 by appropriately combining the above-described resolution Method 1 to Resolution Method 3, a program for executing the method for computing a conversion parameter of Montgomery modular multiplication remainder with a computer, and a device for computing a conversion parameter of Montgomery modular multiplication.

A first aspect of the present invention is the method for computing a conversion parameter of Montgomery modular multiplication for computing a conversion parameter $R^2$ (mod n) of Montgomery modular multiplication where the effective word length of the residue modulo n is taken as m, the bit length per 1 word is taken as k, and $2^{m \times k}=R$, this method comprising: (A) a first step for calculating $H_0=2^v \times R$ (mod n) (where v is an integer, $v \geq 1$, and (m×k)/v is an integer), (B) a second step for calculating $H_p=2^{v \times 2^p} \times R$ (mod n) from $H_0=2^v \times R$ (mod n) by repeating $H_i=REDC(H_{i-1}, H_{i-1})_n$ with respect to i=1, 2, ..., p (where p represents an integer satisfying the condition $2^p \geq (m \times k)/v > 2^{p-1}$, REDC represents the Montgomery modular multiplication REDC(a, b)$_n$=a×b×$R^{-1}$ (mod n), and x^i represents exponential computation $x^i$), and (C) a third step for calculating $H_p=R^2$ (mod n) by calculating $H_p=REDC(H_p, g)_n$ with respect to $H_p$ obtained in the second step when $2^p > (m \times k)/v$ (where $g=2^{k \times E(p,m,k)}$, E(p, m, k)=2×m−(v×$2^p$)/k) and finally outputting $H_p$ as $R^2$ (mod n). Here, the first step comprises (A-1) a step for initializing two registers REG1, REG2 by REG1=n, REG2=$2^{(m-1) \times k}$ (here, REG1 is a register composed of m words and REG2 is a register composed or m or more words), and (A-2) a step for obtaining $2^v \times R$ (mod n) by repeating k+v times the modular squaring computation employing the value of REG1 as a residue modulo with respect to REG2.

In this case, Problems 1, 2, 3, and 5 can be resolved by executing the above-described Resolution Method 1 and Resolution Method 2 by the first step and third step.

A second aspect of the present invention is the method for computing a conversion parameter of Montgomery modular multiplication for computing a conversion parameter $R^2$ (mod n) of Montgomery modular multiplication where the effective word length of the residue modulo n is taken as m, the bit length per 1 word is taken as k, and $2^{m \times k}=R$, this method comprising: (A) a first step for calculating H'=R (mod n), $H_0=2^v \times R$ (mod n) (where v is an integer, $v \geq 1$, and (m×k)/v is an integer), and (B) a second step for calculating and outputting H'=$R^2$ (mod n). Here, in the second step, H'=$R^2$ (mod n) is calculated by repeating (B-1) a step for calculating H'=REDC(H', $H_i)_n$ if the i-th bit value of (m×k)/v is 1 and (B-2) a step for calculating $H_i=REDC(H_{i-1}, H_{i-1})_n$ with respect to i=0, 1, ..., b−1 (here, b is a constant representing the highest-order bit length of (m×k)/v and REDC represents the Montgomery modular multiplication REDC(a, b)=a×b×$R^{-1}$ (mod n)).

In this case, Problems 2 and 4 can be resolved by executing the above-described Resolution Method 3 by the second step.

A third aspect of the present invention is the method for computing a conversion parameter of Montgomery modular multiplication, where the first step comprises: (A-1) a step for initializing two registers REG1, REG2 by REG1 :=n, REG2 :=0 (here, REG1 is a register composed of m words, REG2 is a register composed of m words, and k is a bit length per 1 word); (A-2) a step for obtaining REG1=n'=$2^q$×n by repeating q times the left 1 bit shift with respect to REG1 (here q represents the number of consecutive "0" from the highest-order bit of n represented by m words); (A-3) a step for calculating REG2=R (mod n') by calculating REG2 :=REG2−REG1; (A-4) a step for calculating REG2=$2^q$×R (mod n') by repeating the modular squaring computation q times with respect to REG2; (A-5) a step for calculating REG1=n, REG2=R (mod n) by repeating 1 bit shift to the right q times with respect to REG1, REG2 and then copying the value of REG2 to H'; and (A-6) a step for calculating REG2=$2^v$×R (mod n) by further repeating v times the modular squaring computation employing the value of REG1 as a residue modulo with respect to REG2 and then copying it to $H_0$.

In this case, the speed of the entire calculation can be increased in the case of small q by executing Conventional Method 1 in the first step.

A fourth aspect of the present invention is the method for computing a conversion parameter of Montgomery modular multiplication, where the first step comprises: (A-1) a step for initializing two registers REG1, REG2 by REG1 :=n, REG2 :=$2^{(m-1)\times k}$ (here, REG1 is a register composed of m words, REG2 is a register composed of m or more words, and k is a bit length per 1 word); (A-2) a step for calculating REG2=$2^{m\times k}$ (mod n)=R (mod n) by repeating k times the modular squaring computation employing the value of REG1 as a residue modulo with respect to REG2 and copying the calculation result to H'; and (A-3) calculating REG2=$2^v$×R (mod n) by further repeating the modular squaring computation v times with respect to REG2 and copying the calculation result to $H_0$.

In this case Problem 1 and Problem 3 can be resolved by employing the above-described Resolution Method 1 in the first step.

The fifth aspect of the present invention is a program for a method for computing a conversion parameter of Montgomery modular multiplication where the effective word length of the residue modulo n is taken as m, the bit length per 1 word is taken as k, and $2^{m\times k}$=R, this program serving to execute on a computer a method for computing a conversion parameter of Montgomery modular multiplication comprising: (A) a first step for calculating $H_0$=$2^v$×R (mod n) (where v is an integer, v≧1, and (m×k)/v is an integer), (B) a second step for calculating $H_p$=$2^{v\times 2^p}$×R (mod n) from $H_0$=$2^v$×R (mod n) by repeating $H_i$=REDC($H_{i-1}$, $H_{i-1}$)$_n$ with respect to i=1, 2, . . . , p (where p represents integer satisfying the condition $2^p$≧(m×k)/v>$2^{p-1}$, REDC represents the Montgomery modular multiplication REDC(a, b)$_n$=a×b×$R^{-1}$ (mod n), and x^i represents exponential computation $x^i$), and (C) a third step for calculating $H_p$=$R^2$ (mod n) (where g=$2^{k\times E(p,m,k)}$, E(p, m, k)=2×m−(v×$2^p$)/k) by calculating $H_p$=REDC($H_p$, g)$_n$ with respect to $H_p$ obtained in the second step when $2^p$>(m×k)/v and finally outputting $H_p$ as $R^2$ (mod n). Here, the first step comprises (A-1) a step for initializing two registers REG1, REG2 by REG1=n, REG2=$2^{(m-1)\times k}$ (here, REG1 is a register composed of m words and REG2 is a register composed of m or more words), and (A-2) a step for obtaining $2^v$×R (mod n) by repeating k+v times the modular squaring computation employing the value of REG1 as a residue modulo with respect to REG2.

In this case, Problems 1, 2, 3, and 5, which are the problems of the conventional methods, can be resolved and high-speed computation can be carried out when the method for computing a conversion parameter of Montgomery modular multiplication described in claim 1 is executed on a computer.

A sixth aspect of the present invention is a program for a method for computing a conversion parameter $R^2$ (mod n) of Montgomery modular multiplication where the effective word length of the residue modulo n is taken as m, the bit length per 1 word is taken as k, and $2^{m\times k}$=R, this program serving to execute on a computer a method for computing a conversion parameter of Montgomery modular multiplication comprising:

(A) a first step for calculating H'=R (mod n), $H_0$=$2^v$×R (mod n) (where v is an integer, v≧1, and (m×k)/v is an integer), and (B) a second step for calculating and outputting H'=$R^2$ (mod n). Here, in the second step, H'=$R^2$ (mod n) is calculated by repeating (B-1) a step for calculating H'=REDC(H', $H_i$)$_n$ if the i-the bit value of (m×k)/v is 1 and (B-2) a step for calculating $H_i$=REDC($H_{i-1}$, $H_{i-1}$)$_n$ with respect to i=0, 1, . . . , b−1 (here, b is a constant representing the highest-order bit length of (m×k)/v and REDC represents the Montgomery modular multiplication remainder REDC(a, b)=a×b×$R^{-1}$ (mod n)).

In this case, Problems 2 and 4, which are the problems of the conventional methods, can be resolved and high-speed computation can be carried out when the method for computing a conversion parameter of Montgomery modular multiplication described in claim 2 is executed on a computer.

A seventh aspect of the present invention is a device for computing a conversion parameter of Montgomery modular multiplication where the effective word length of the residue modulo n is taken as m, the bit length per 1 word is taken as k, and $2^{m\times k}$=R, this device comprising: a first register REG1 composed of m words; a second register REG2 composed of m or more words; an initialization processing unit for initializing the two registers REG1, REG2 by REG1=n, REG2=$2^{(m-1)\times k}$; a $H_0$ computation unit for computing $H_0$=$2^v$×R (mod n) (where v is an integer, v≧1, and (m×k)/v is an integer) by repeating k+v times the modular squaring computation employing the value of the first register REG1 as a residue modulo with respect to the second register REG2; a $H_p$ computation unit for calculating $H_p$=$2^{v\times 2^p}$×R (mod n) from $H_0$=$2^v$×R (mod n) by repeating $H_i$=REDC($H_{i-1}$, $H_{i-1}$)$_n$ with respect to i=1, 2, . . . , p (where p represents integer satisfying the condition $2^p$≧(m×k)/v>$2^{p-1}$, REDC represents the Montgomery modular multiplication REDC(a, b)$_n$=a×b×$R^{-1}$ (mod n), and x^i represents exponential computation $x^i$); and a parameter output unit for calculating $H_p$=$R^2$ (mod n) by calculating $H_p$=REDC($H_p$, g)$_n$ with respect to $H_p$ obtained with the $H_p$ computation unit when $2^p$>(m×k)/v (where g=$2^{k\times E(p,m,k)}$, E(p, m, k)=2×m−(v×$2^p$)/k) and finally outputting the obtained $H_p$ as $R^2$ (mod n).

In this case, Resolution Method 1 can be implemented and Problems 1 and 3 can be resolved with the initialization processing unit and $H_0$ computation unit. Furthermore, Resolution Method 2 can be implemented and Problems 2 and 5 can be resolved with the parameter output unit.

A eighth aspect of the present invention is a device for computing a conversion parameter $R^2$ (mod n) of Montgomery modular multiplication where the effective word length of the residue modulo n is taken as m, the bit length per 1 word is taken as k, and $2^{m\times k}$=R, this device comprising: an $H_0$ computation unit for calculating H'=R (mod n), $H_0$=$2^v$×R (mod n) (where v is an integer, $v \geq 1$, and $(m \times k)/v$ is an integer) and an H' computation unit for calculating and outputting H'=R² (mod n) by repeating a step for calculating H'=REDC(H', $H_i$)$_n$ if the i-th bit value of $(m \times k)/v$ is 1 and a step for calculating $H_i$=REDC($H_{i-1}$, $H_{i-1}$)$_n$ with respect to i=0, 1, ..., b−1 (here, b is a constant representing the highest-order bit length of $(m \times k)/v$ and REDC represents the Montgomery modular multiplication computation REDC(a, b)=a×b×R⁻¹ (mod n)).

In this case, Resolution Method 3 can be implemented with the H' computation unit and, therefore, Problems 2 and 4 can be resolved.

BRIEF DESCRIPTION OF THE DRAWINGS

FIG. 1 is an explanatory drawing illustrating the algorithm of Montgomery modular multiplication.

FIG. 2 is an explanatory drawing illustrating an example of modular exponentiation computation using the Montgomery modular multiplication.

FIG. 3 is an explanatory drawing illustrating the calculation algorithm of a conversion parameter H using addition and subtraction.

FIG. 7 is an explanatory drawing illustrating the condition for n' necessary to establish the calculation of (mod n')=0−n' in the conventional method.

FIG. 8 is an explanatory drawing illustrating the essence of processing in Step $B_2$ in Conventional Method 2 and problems associated therewith.

FIG. 9 is an explanatory drawing illustrating a method for computing 2$^v$×R (mod n) used in Resolution Method 1 in accordance with the present invention.

FIG. 10 is an explanatory drawing illustrating a method for computing R² (mod n) used in Resolution Method 3 in accordance with the present invention.

FIG. 13 is a flowchart of Embodiment 1.

DESCRIPTION OF THE PREFRRED EMBODIMENTS

First Embodiment

The first embodiment of the present invention will be described below based on the flowchart shown in FIG. 11.

Figure 11:
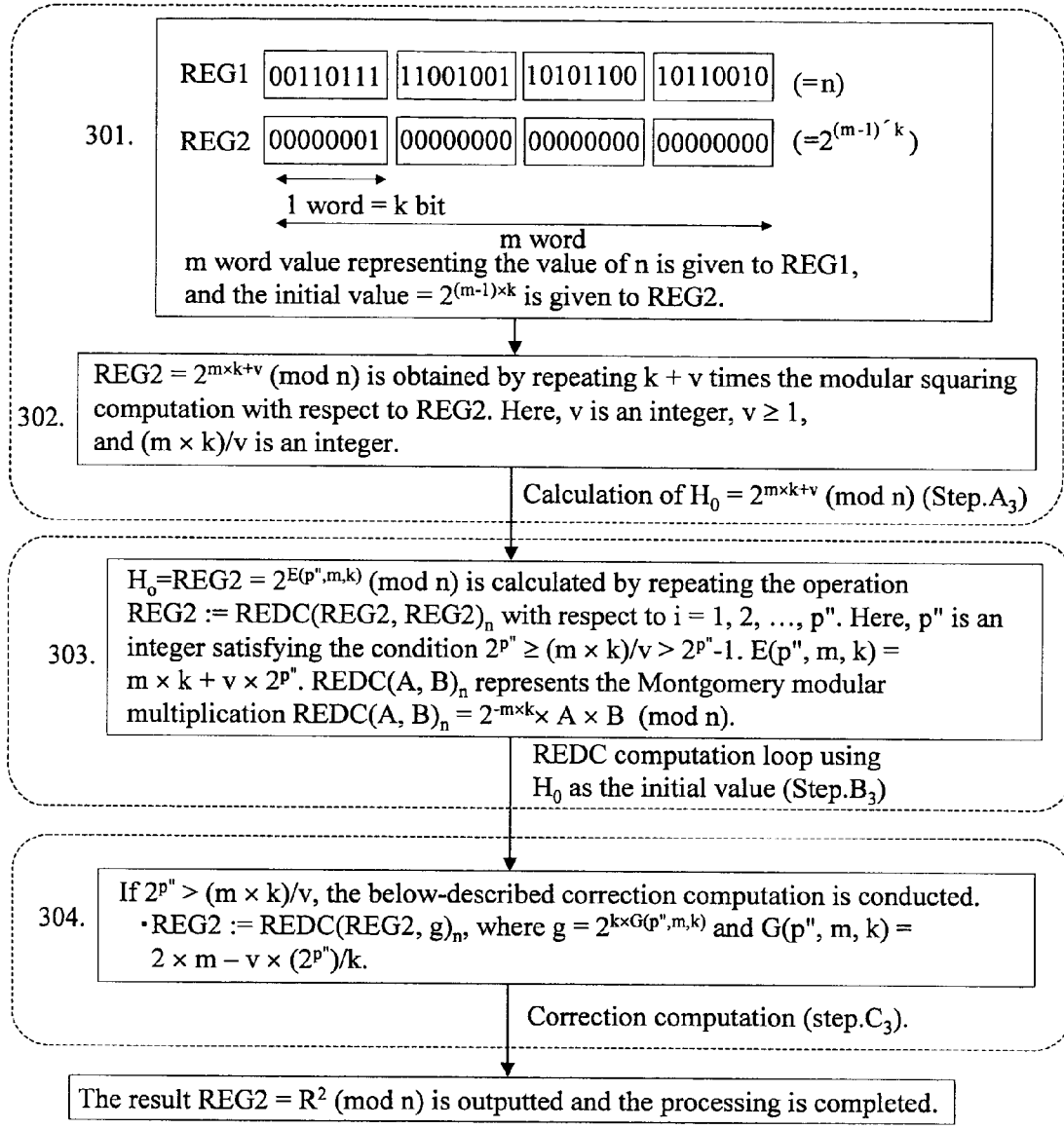
FIG. 11 is a flowchart of the first mode for carrying out the present invention.

As shown in FIG. 11, the first embodiment is composed mainly of Step $A_3$, Step $B_3$, and Step $C_3$.

Here, the input is n (residue modulo) and the output is R² (mod n) (where R=2$^{m \times k}$ (mod n)).

In Step $A_3$, $H_0$ satisfying $H_0$=2$^{m \times k+v}$ (mod n) is calculated by using shifting and subtraction. Here, the following conditions are assumed to be satisfied: v is an integer, $v \geq 1$, and $(m \times k)/v$ is an integer.

In Step $B_3$, H=2$^{E(p'',m,k)}$ (mod n) is calculated by using the REDC computation. Here, E(p'', m, k)=m×k+v×2$^{p''}$, p'' is an integer satisfying the condition 2$^{p''}$>(m×k)/v>2$^{(p''-1)}$.

In Step $C_3$, if 2$^{p''}$>(m×k)/v, correction computation with H=REDC (H, G) is conducted with respect to g=2$^{k \times G(p'',m,k)}$. Here, G(p'', m, k)=2×m−(v×2$^{p''}$)/k is an integer satisfying the conditions $1 \leq G$(p'', m, k)$\leq$m−1. Upon completion of computation, H=R² (mod n) is outputted and processing is completed.

The algorithm of the first embodiment will be described below in greater detail.

In step 301, REG1 :=n, REG2 :=2$^{(m-1) \times k}$ are given as initial values for two registers. Here, the effective word length of n is m.

In step 302, the modular squaring computation is repeated k+v times with respect to REG2 to obtain REG2=2$^{m \times k+v}$ (mod n). Here, v is an integer, $v \geq 1$, and $(m \times k)/v$ is an integer.

In step 303, REG2=2$^{E(p'',m,k)}$ (mod n) is calculated by repeating p'' times the operation REG2 :=REDC(REG2, REG2)$_n$. Here, p'' is an integer satisfying the condition 2$^{p''} \geq$ (m×k)/v>2$^{(p''-1)}$. E(p'', m, k)=m×k+v×2$^{p''}$. REDC(A, B)$_n$ represents the Montgomery modular multiplication REDC(A, B)$_n$=A×B×2$^{-m \times k}$ (mod n).

In step 304, if 2$^{p''}$>(m×k)/v, correction computation based on REG2 :=REDC(REG2, g)$_n$ is conducted. Here, g=2$^{k \times G(p'',m,k)}$ and G(p'', m, k)=2×m−(v×2$^{p''}$)/k. REG2=R² (mod n) is outputted and processing is completed.

In the first embodiment of such a configuration, in steps 301, 302, the computation of REG2=2$^v$×R (mod n) is conducted by using the above-described Resolution Method 1 and the MSB of n is not necessary to calculate.

Furthermore, in steps 303, 304, R² (mod n) is calculated from 2$^v$×R (mod n) by using Resolution Method 2 and the limitation of (m×k)/v being a power of 2 is unnecessary. In step 303, REG2=2$^{E(p'',m,k)}$ (mod n) can be obtained by repeating p'' times the operation of raising to the squaring by using the Montgomery modular multiplication computation with respect to REG2=2$^v$×R. Here, p'' is an integer satisfying the condition 2$^{p''} \geq$(m×k)/v>2$^{(p''-1)}$, E(p'', m, k)=m×k+v×2$^{p''}$. In step 304, when 2$^{p''}$>(m×k)/v, REG2=R² (mod n) can be calculated by conducting correction computation based on REG2 :=REDC(REG2, g)$_n$. Here, g=2$^{k \times G(p'',m,k)}$ and G(p'', m, k)=2×m−(v×2$^{p''}$)/k.

Thus, in the first embodiment, the calculation of MSB of n is made unnecessary and Problem 1 and Problem 3 are resolved by using Resolution Method 1. Furthermore, the limitation of (m×k)/v being a power of 2 is made unnecessary, Problem 2 is resolved, and also the detection of bit value of (m×k)/v is made unnecessary, and Problem 5 is resolved by using Resolution Method 2.

Second Embodiment

The second embodiment of the present invention will be described below based on the flowchart shown in FIG. 12.

Figure 12:
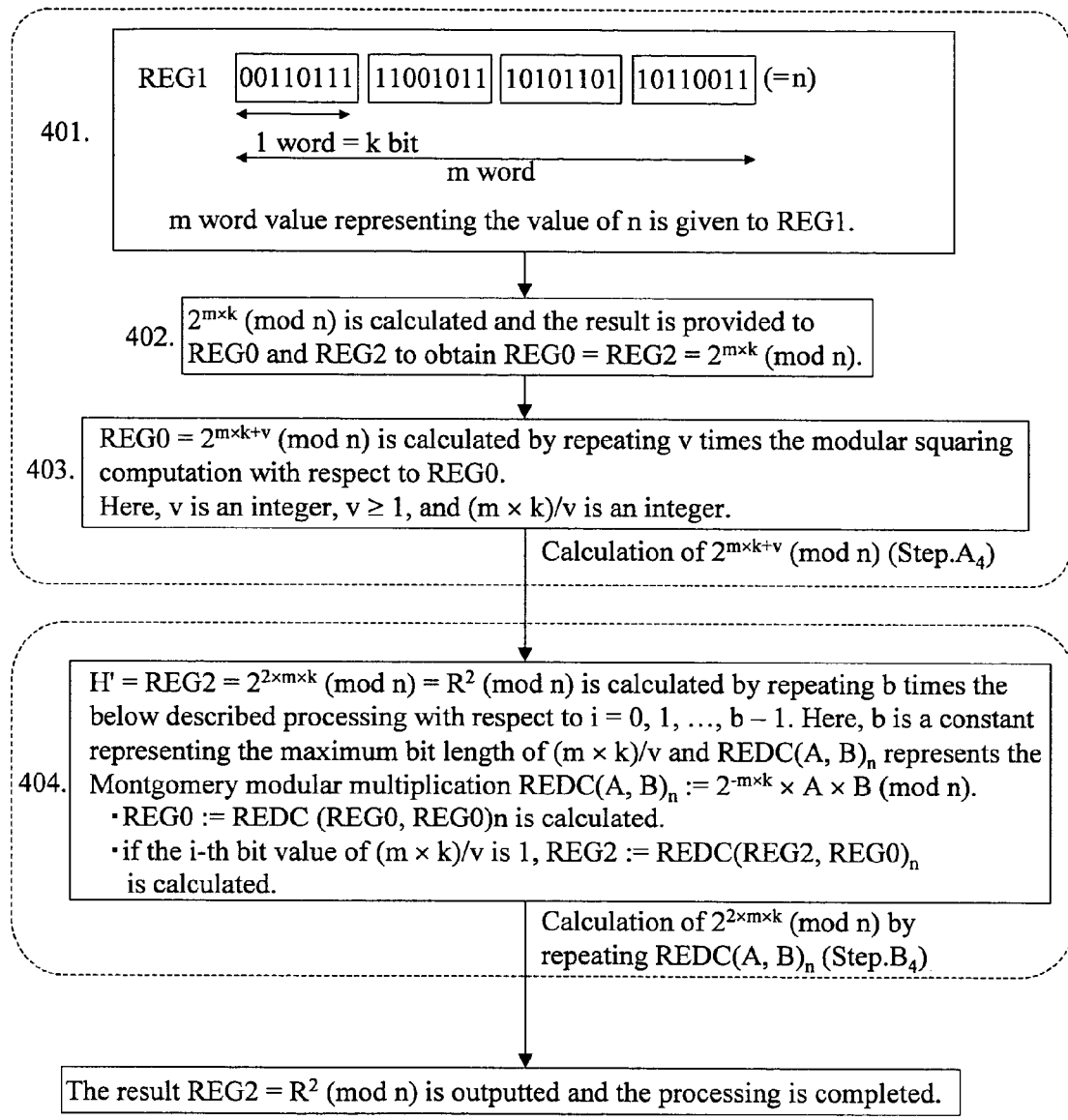
FIG. 12 is a flowchart of the second mode for carrying out the present invention.

As shown in FIG. 12, the second embodiment is composed mainly of Step $A_4$ and Step $B_4$. Here, the input is n (residue modulo) and the output is R² (mod n) (where R=2$^{m \times k}$ (mod n)).

In Step $A_4$, H'=R (mod n), $H_0$=2$^v$×R (mod n) are calculated.

In Step $B_4$, H=R² (mod n) is calculated from H' and $H_0$ by using REDC computation. In this computation, each bit value of m×k is detected in the order from the lowest-order bit to the highest-order bit and the REDC computation is repeated once or twice correspondingly to "0" or "1" of each bit value.

The advantage of the second embodiment over Conventional Method 2 is that the calculation of MSB of (m×k)/v is not necessary. However, a constant b representing the maximum bit length of (m×k)/v is necessary.

Furthermore, using the method indicated in Step $A_3$ in the first embodiment of the present invention to calculate $H_0$ in Step $A_4$ makes it unnecessary to calculate the effective bit of n.

Step $A_4$ and Step $B_4$ will be described below in greater detail.

In step 401, REG1 :=n is given as an initial value (here, the effective word length of n is m).

In step 402, $2^{m \times k}$ (mod n) is computed and the result is provided to REG0 and REG2 to obtain REG0=REG2=$2^{m \times k}$ (mod n).

In step 403, REG0=$2^{m \times k + v}$ (mod n) is calculated by repeating v times the modular squaring computation with respect to REG0. Here, the following conditions are satisfied: v is an integer, v≧1, and (m×k)/v is an integer.

In step 404, REG2=$2^{2 \times m \times k}$=$R^2$ (mod n) is computed by repeating b times the below described processing ① and ② with respect to i=0, 1, ..., b−1. Here, b is a constant representing the maximum bit length of (m×k)/v and REDC(A, B)$_n$ represents the Montgomery modular multiplication REDC (A, B)$_n$=A×B×$2^{-m \times k}$ (mod n).
① REG0 :=REDC(REG0, REG0)$_n$ is computed.
② if the i-th bit value of m×k is 1, REG2 :=REDC(REG2, REG0)$_n$ is calculated.

In the second embodiment, an initial value n is given to REG1 in step 401 and, by contrast with the first embodiment, no initial value is given to REG2. This is because the initial values differ depending on the realization method of step 402.

In step 402, after the computation of $2^{m \times k}$ (mod n) has been completed, the computation result is provided to REG0 and REG2 to obtain REG0=REG2=$2^{m \times k}$ (mod n). There are many realization methods for calculating $2^{m \times k}$ (mod n); for example, Resolution Method 1 can be realized by employing a configuration identical to that of the first embodiment and the calculation of the MSB relating to n can be made unnecessary.

In step 403, REG0=$2^{m \times k}$ (mod n) is calculated by repeating v times the modular squaring computation with respect to REG0.

Further, in step 404, Resolution Method 3 is realized and the limitation relating to v and the effective bit length count of (m×k)/v are unnecessary. Here, H=$R^2$ (mod n) is calculated by detecting each bit value of (m×k)/v and conducting once or twice the REDC computation with respect to bit values. As a result, in Conventional Method 2, when the i-th bit value was detected, the detection was conducted with respect to the effective bit length p' of (m×k)/v in the order of i=p'−2, ..., 1, 0, whereas, in the second embodiment, the detection is conducted with respect to the maximum bit length b of (m×k)/v in the order of i=0, 1, ..., b−1. In other words, in accordance with the present invention, the merit of the present invention is that only the constant b, which is the maximum bit length of (m×k)/v, may be given and it is not necessary to calculate the effective bit length of (m×k)/v, which changes depending on the input values. When the detection is changed to the order of i=b−1, ..., 1, 0 with respect to Conventional Method 2, as long as the condition b=p' is not satisfied, $R^2$(mod n) is not matched and the target parameter H cannot be calculated.

Thus, with the second embodiment, Problem 2 and Problem 4 can be realized because Resolution Method 3 is realized in step 404, the limitation of (m×k)/v being a power of 2 is eliminated, and the computation of the MSB of (m×k)/v becomes unnecessary.

In FIG. 12, the method of calculating $2^{m \times k}$ (mod n) in step 402 is not specified, but if the Resolution Method 1 identical to that of the first embodiment is employed, the calculation of the MSB relating to n becomes unnecessary and additionally Problem 1 and Problem 3 can be resolved.

EXAMPLE 1

Example 1 of implementing the first embodiment of the present invention will be explained based on the flowchart shown in FIG. 13.

Steps 501 to 504 in FIG. 13 correspond to steps 301 to 304 of FIG. 11. The modular squaring computation in step S302 is conducted by making 1 bit shift to the left in REG2 in step 502 and then subtracting REG1 from REG1 if REG2≧REG1. Instead, it is also possible to conduct the addition processing of REG2 :=REG2+REG2 and to subtract REG1 from REG2 if REG2≧REG1.

Calculation amounts that are necessary in Example 1 are shown in Table 3.

TABLE 3

| | \multicolumn{5}{c}{Calculation amounts necessary for Example 1} |
|---|---|---|---|---|---|
| | 501 | 502 | 503 | 504 | Total |
| SFT | 0 | k + v | 0 | 0 | k + v |
| SUB | 0 | 0.5(k + v) | 0 | 0 | 0.5(k + v) |
| REDC | 0 | 0 | p" | 0 ($2^{p''}$ = (m × k)/v) | p" ($2^{p''}$ = (m × k)/v) |
| | | | | 1 ($2^{p''}$ > (m × k)/v > $2^{p''-1}$) | p" + 1 ($2^{p''}$ > (m × k)/v > $2^{p''-1}$) |

EXAMPLE 2

Example 2 of implementing the second embodiment of the present invention will be explained based on the flowchart shown in FIG. 14.

Figure 14:
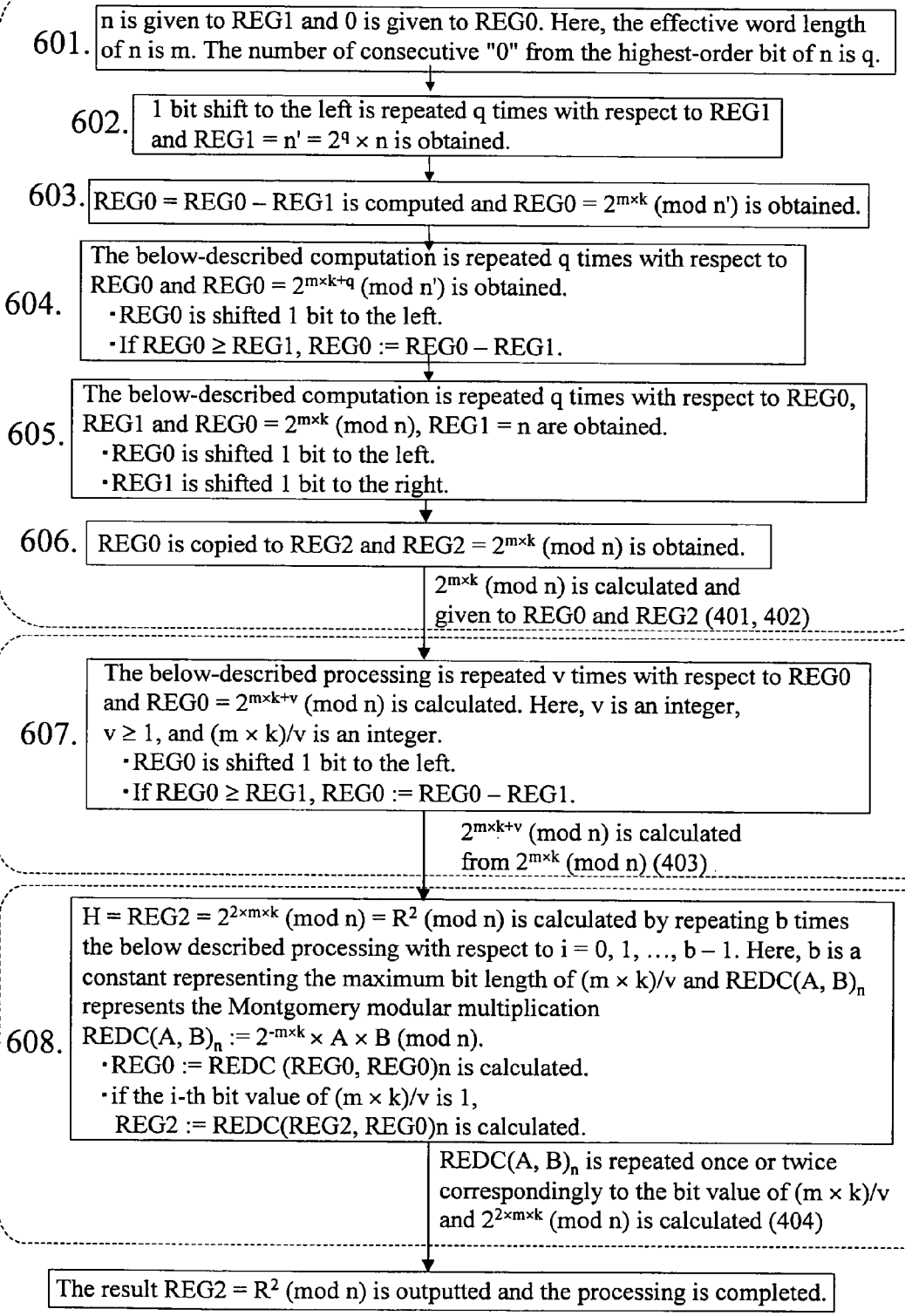
FIG. 14 is a flowchart of Embodiment 2.

FIG. 14 illustrates an example in which a method for calculating $2^{m \times k}$ (mod n) in step 402 of FIG. 12 and a method for calculating in modular squaring computation in step 403 are specified.

The processing of steps 401, 402 shown in FIG. 12 is carried out with steps 601 to 606, the processing of step 403 shown in FIG. 12 is carried out with step 606, and the processing of step 404 shown in FIG. 12 is carried out with step 607.

Figure 4:
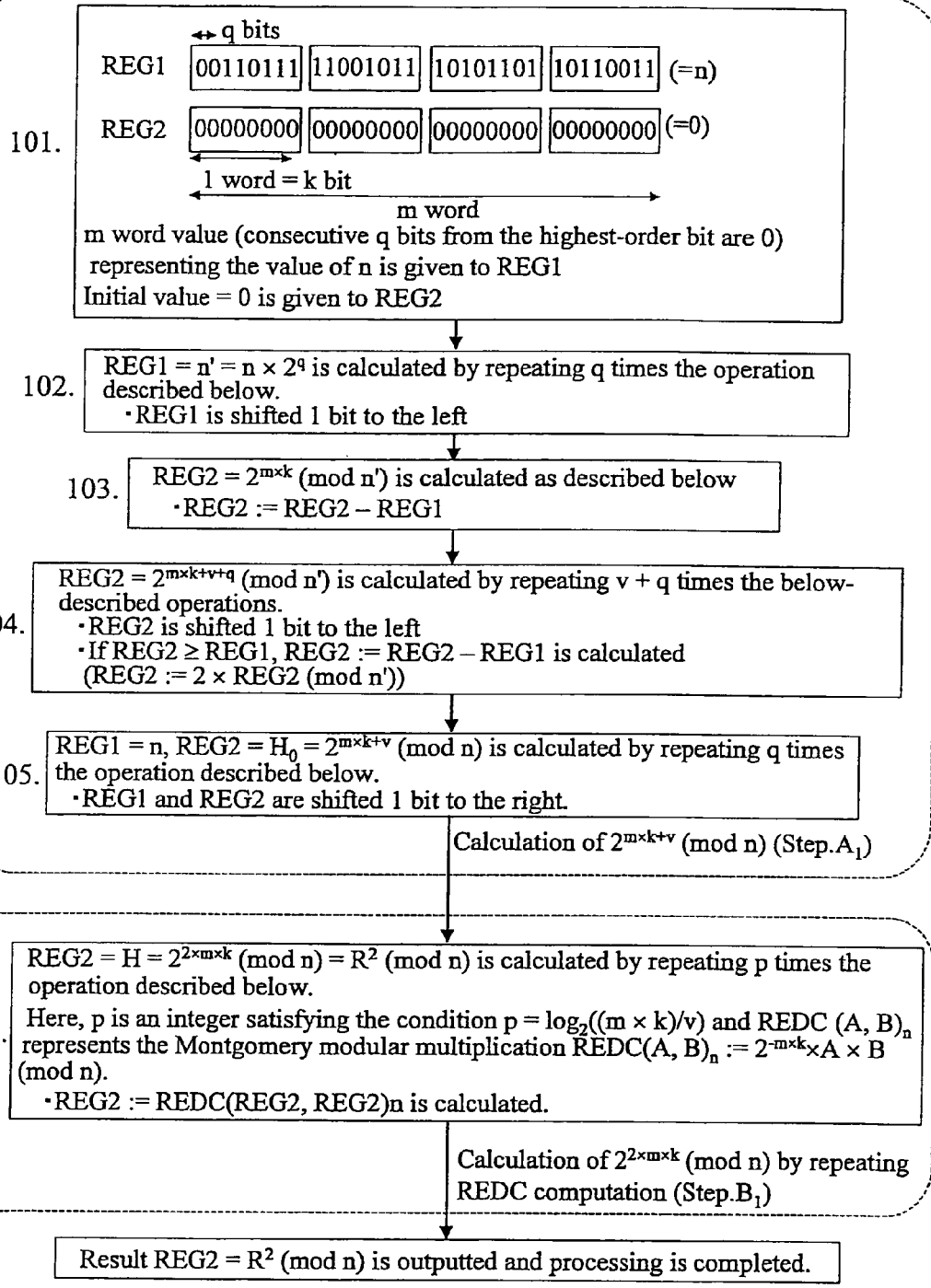
FIG. 4 is a flowchart of Conventional Method 1.
Figure 5:
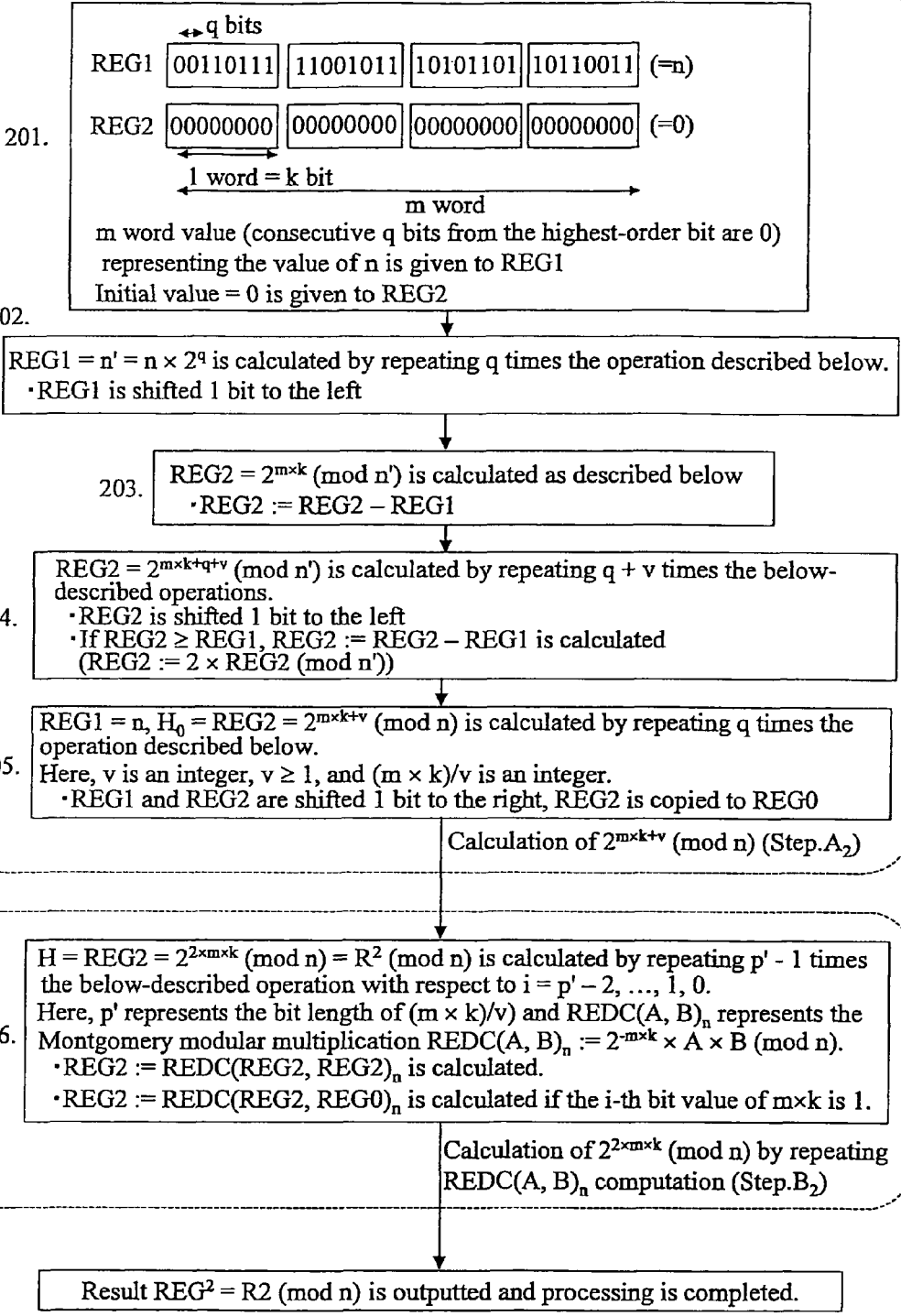
FIG. 5 is a flowchart of Conventional Method 2.
Figure 6:
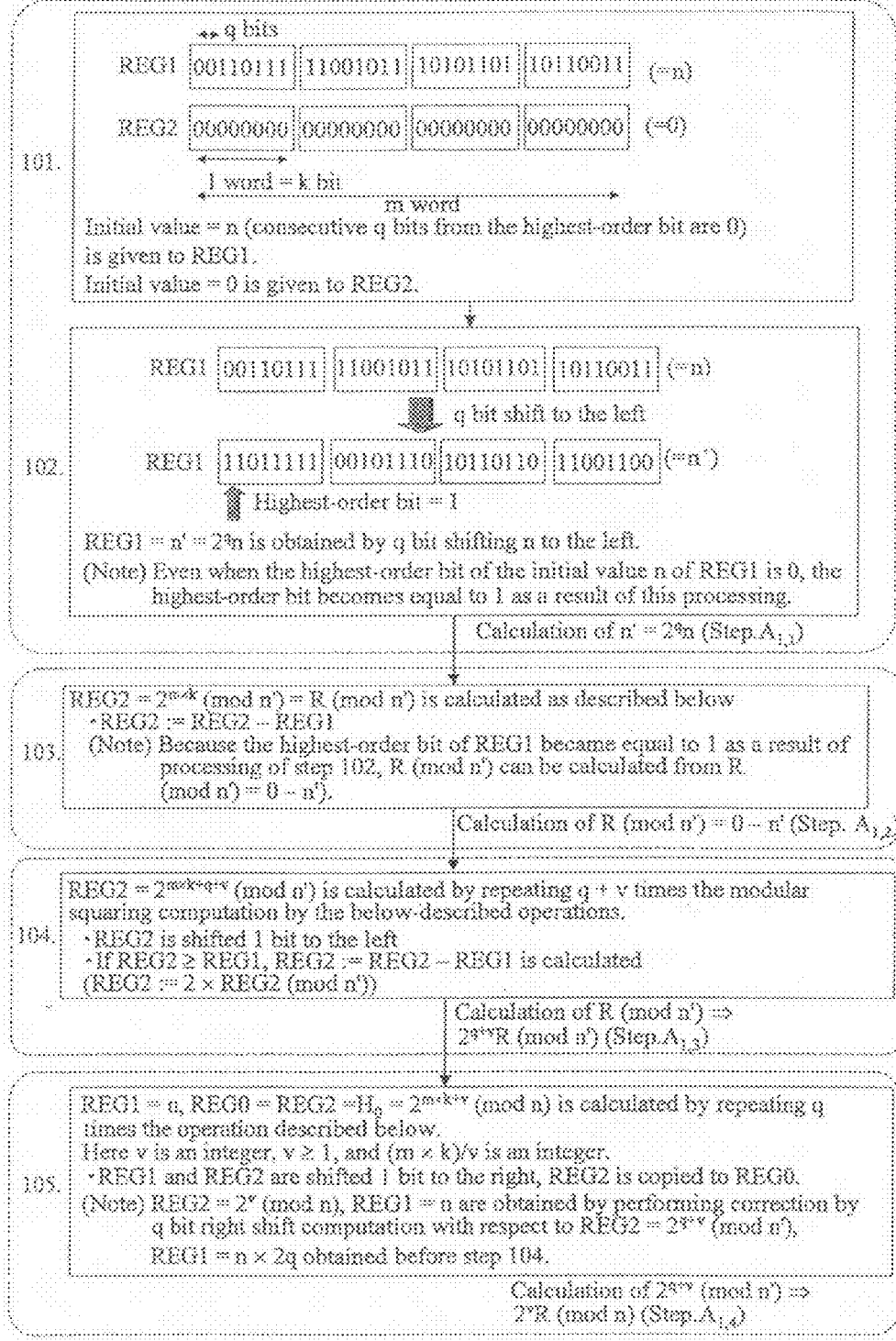
FIG. 6 is a flowchart of 2$^v$R (mod n) calculation processing in the conventional method that causes Problem 1 and Problem 3.

REG0=REG2=$2^{m \times k}$ (mod n) is computed by the processing of steps 601 to 606. This computation can be conducted by assuming v=0 in the method illustrated by FIG. 6.

In step 607, REG0=$2^{m \times k + v}$ (mod n) is obtained by repeating v times the modular squaring computation with respect to REG0.

In step 608, REG2=$2^{2 \times m \times k}$ (mod n)=$R^2$ (mod n) is calculated by repeating once or twice the REDC computation correspondingly to each bit value of (m×k)/v by using Resolution Method 3.

Calculation amounts that are necessary in Example 2 are shown in Table 4.

TABLE 4

Calculation amounts necessary for Example 2

|     | 601 | 602 | 603 | 604  | 605 | 606 | 607  | 608 | Total |
| --- | --- | --- | --- | ---- | --- | --- | ---- | --- | ----- |
| SFT | 0   | q   | 0   | q    | 2q  | 0   | v    | 0   | 4q + v |
| SUB | 0   | 0   | 1   | 0.5q | 0   | 0   | 0.5v | 0   | 0.5(q + v) + 1 |
| REDC | 0  | 0   | 0   | 0    | 0   | 0   | 0    | b + 1 + W((m × k)/v) | b + 1 + W((m × k)/v) |

EXAMPLE 3

Example 3 of implementing the second embodiment of the present invention will be explained based on the flowchart shown in FIG. 15.

Figure 15:
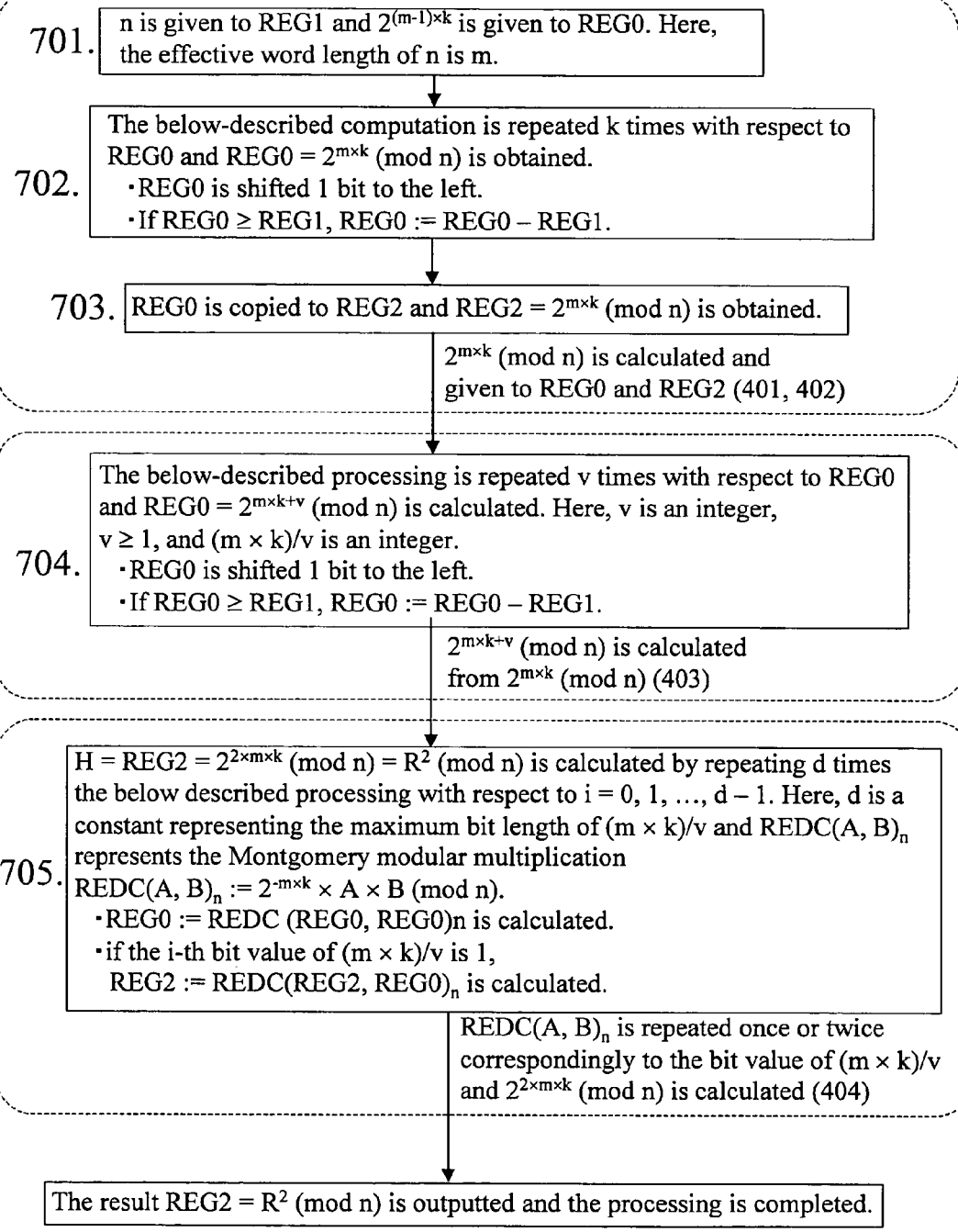
FIG. 15 is a flowchart of Embodiment 3.

FIG. 15 illustrates an example in which, similarly to Example 2, a method for calculating $2^{m \times k}$ (mod n) in step 402 of FIG. 12 and a method for calculating in modular squaring computation in step 403 are specified. Using the procedure of Resolution Method 1 for a calculation method of step 402 makes it possible to resolve Problem 1 and Problem 3 in addition to resolving Problem 2 and Problem 4 in the same manner as in Example 2.

FIG. 15 will be explained below. The processing of steps 401, 402 shown in FIG. 12 is carried out in steps 701 to 703, the processing of step 403 shown in FIG. 12 is carried out in step 704, and the processing of step 404 shown in FIG. 12 is carried out in step 705. Those processing steps are explained below.

REG0=REG2=$2^{m \times k}$ (mod n) is calculated by the processing of steps 701 to 703. In this calculation, the processing of Resolution Method 1 is carried out by assuming v=0. As a result, the calculation of the MSB of n becomes unnecessary and Problem 1 and Problem 3 can be resolved. After REG0=REG2=$2^{m \times k}$ (mod n) has been calculated by this processing, the processing using Resolution Method 3 is carried out in steps 704, 705 and REG2=$R^2$ (mod n) is calculated. Because the limitation of (m×k)/v being a power of 2 is eliminated and the calculation of the MSB of (m×k)/v is unnecessary, Problem 4 can be resolved. Finally, the value of REG2 is outputted as a parameter H and the processing is completed.

Calculation amounts that are necessary in Example 3 are shown in Table 5.

TABLE 5

Calculation amounts necessary for Example 2

|     | 701 | 702 | 703 | 704 | 705 | Total |
| --- | --- | --- | --- | --- | --- | ----- |
| SFT | 0   | k   | 0   | v   | 0   | k + v |
| SUB | 0   | 0.5k | 0  | 0.5v | 0  | 0.5(k + v) |
| REDC | 0  | 0   | 0   | 0   | b + 1 + W((m × k)/v) | b + 1 + W((m × k)/v) |

As shown in Table 6, problems 1 to 5 can be resolved in the above-described Examples 1 to 3.

TABLE 6

Problems that can be resolved by the present invention

| First embodiment | Second embodiment | |
| --- | --- | --- |
| Example 1 | Example 2 | Example 3 |
| Problems 1, 2, 3, 5 | Problems 2, 4 | Problems 1, 2, 3, 4 |

Furthermore, for certain conditions relating to n, the present invention makes it possible to realize the processing with the calculation amounts less than those of the conventional method. Comparison of calculation amounts is illustrated by Table 7 below. In Table 7, the calculation amounts of addition, subtraction, and shifting are assumed to the same and all those calculations are denoted by ADD. Furthermore REDC represents the Montgomery modular multiplication.

TABLE 7

Comparison of calculation amounts of the conventional method and present invention

|     |     | ADD | REDC |
| --- | --- | --- | ---- |
| Conventional Method 1 | | 4.5q + 1.5v + 1 | p |
| Conventional Method 2 | | 4.5q + 1.5v + 1 | p' · 1 + W((m × k)/v) |
| Invention 1 | Example 1 | 1.5k + 1.5v | p" ($2^{p"}$ = (m × k)/v) |
|     |     |     | p" + 1 ($2^{p"}$ > (m × k)/v > $2^{p"-1}$) |
| Invention 2 | Example 2 | 4.5q + 1.5v + 1 | b + 1 + W((m × k)/v) |
|     | Example 3 | 1.5q + 1.5v | b + 1 + W((m × k)/v) |

Comparison of calculation amounts of ADD in Table 7 demonstrates, that when 4.5q+1.5v+1>1.5k+1.5v, Examples 1 and 3 can realize processing with calculation amounts smaller than those that Conventional Methods 1 and 2. The condition for this is k≦3q, that is, when the number of consecutive "0" from the highest-order bit of n is equal to or higher than k/3, Examples 1 and 3 can decrease the number of ADD cycles with respect to that of the conventional methods.

Furthermore, examples of comparing the calculation amounts including REDC are shown in the below-described Comparison Examples 1, 2.

COMPARISON EXAMPLE 1

The Case of 1024-Bit RSA, 1 Word=32 bits, v=1

In this case, n is 1024 bits. Furthermore, because 1 word=32 bits, k=32 and the word length m for representing 1024 bit is 32. At this time, q=0 because the highest-order bit of n is 1. Therefore, (m×k)/v=1024=$(10000000000)_2$ and W((m×k)/v)=0. Furthermore, the maximum bit length of the RSA encryption is assumed to be 1024 bit and b is taken as b=11. Under those conditions, the calculation amounts necessary for the conventional methods and present invention are as follows.

Conventional Method 1
  ADD is 2.5 times and p=10. Therefore, REDC is 10 times.
Conventional Method 2
  ADD is 2.5 times and p'=11, W((m×k)/v)=0. Therefore, REDC is 10 times.

EXAMPLE 1

ADD is 1.5×32+1.5×1=49.5 times, p"=10 and $2^{p''}$=(m×k)/v. Therefore, REDC is 10 times.

EXAMPLE 2

ADD is 2.5 times, b=11 and W((m×k)/v)=0. Therefore, REDC is 12 times.

EXAMPLE 3

ADD is 1.5×32+1.5×1=49.5 times, b=11 and W((m×k)/v)=0. Therefore, REDC is 12 times.
  The above-described results are assembled in Table 8. Using Example 2 makes it possible to resolve the problems of the conventional methods at a calculation amount relating to ADD being equal to that of the conventional methods.

TABLE 8

Comparison of calculation amounts in Comparison Example 1

| | Conventional Method 1 | Conventional Method 1 | Example 1 | Example 2 | Example 3 |
|---|---|---|---|---|---|
| ADD | 2.5 | 2.5 | 49.5 | 2.5 | 49.5 |
| REDC | 10 | 10 | 10 | 12 | 12 |

COMPARISON EXAMPLE 2

163-Bit Elliptic Curve Encryption, 1 Word=8 Bits, v=21 in Conventional Method 1, v=3 Elsewhere In this case, n is 163 bits. Furthermore, because 1 word is 8 bits, k=8 and the word length m for representing 163 bit is 21. At this time, q=5 because high-order 8×21−163=5 bit of n are 0. As for v, because of limitation placed on parameter selection, v=21 is assumed only in Conventional Method 1, and in Conventional Method 2 and Examples 1, 2, 3, v is taken as 3. In the case of v=21, (m×k)/v=8=$(1000)_2$ and W((m×k)/v)=0. Furthermore, in the case of v=3, (m×k)/v=56=$(111000)_2$ and W((m×k)/v)=2. Furthermore, the maximum bit length of the elliptic curve encryption is assumed to be 255 bit and b is taken as 8. Under those conditions the calculation amounts necessary for the conventional methods and present invention are as follows.
Conventional Method 1
  ADD is 4.5×5+1.5×21=54 times and p=3. Therefore, REDC is 3 times.
Conventional Method 2
  ADD is 4.5×5+1.5×3=27 times and p'=6, W((m×k)/v)=2. Therefore, REDC is 7 times.

EXAMPLE 1

ADD is 1.5×8+1.5×3=16.5 times, p"=6 and $2^{p''}$>(m×k)/v. Therefore, REDC is 7 times.

EXAMPLE 2

ADD is 4.5×5+1.5×3=27 times, b=8 and W((m×k)/v)=2. Therefore, REDC is 10 times.

EXAMPLE 3

ADD is 1.5×8+1.5×3=16.5 times, b=8 and W((m×k)/v)=2. Therefore, REDC is 10 times.
  The above-described results are assembled in Table 9. Using Examples 1 and 3 makes it possible to reduce the number of ADD cycles with respect to that of the conventional methods, while resolving the problems inherent to the conventional methods. Furthermore, when a case is assumed where the REDC computation is conducted at a high speed by using a special hardware such as a coprocessor and ADD=REDC, the calculation amount of Example 1 is 16.5+7=23.5 and the calculation amount of Example 3 is 16.5+10=26.5, that is, the total amount of computation can be reduced by comparison with that of Conventional Method 1 (54+3=57) and Conventional Method 2 (27+7=34).

TABLE 9

Comparison of calculation amounts in Comparison Example 2

| | Conventional Method 1 | Conventional Method 1 | Example 1 | Example 2 | Example 3 |
|---|---|---|---|---|---|
| ADD | 54 | 27 | 16.5 | 27 | 16.5 |
| REDC | 3 | 7 | 7 | 10 | 10 |
| Total (assuming that ADD = REDC) | 57 | 34 | 23.5 | 37 | 26.5 |

OTHER EMBODIMENTS

Figure 16:
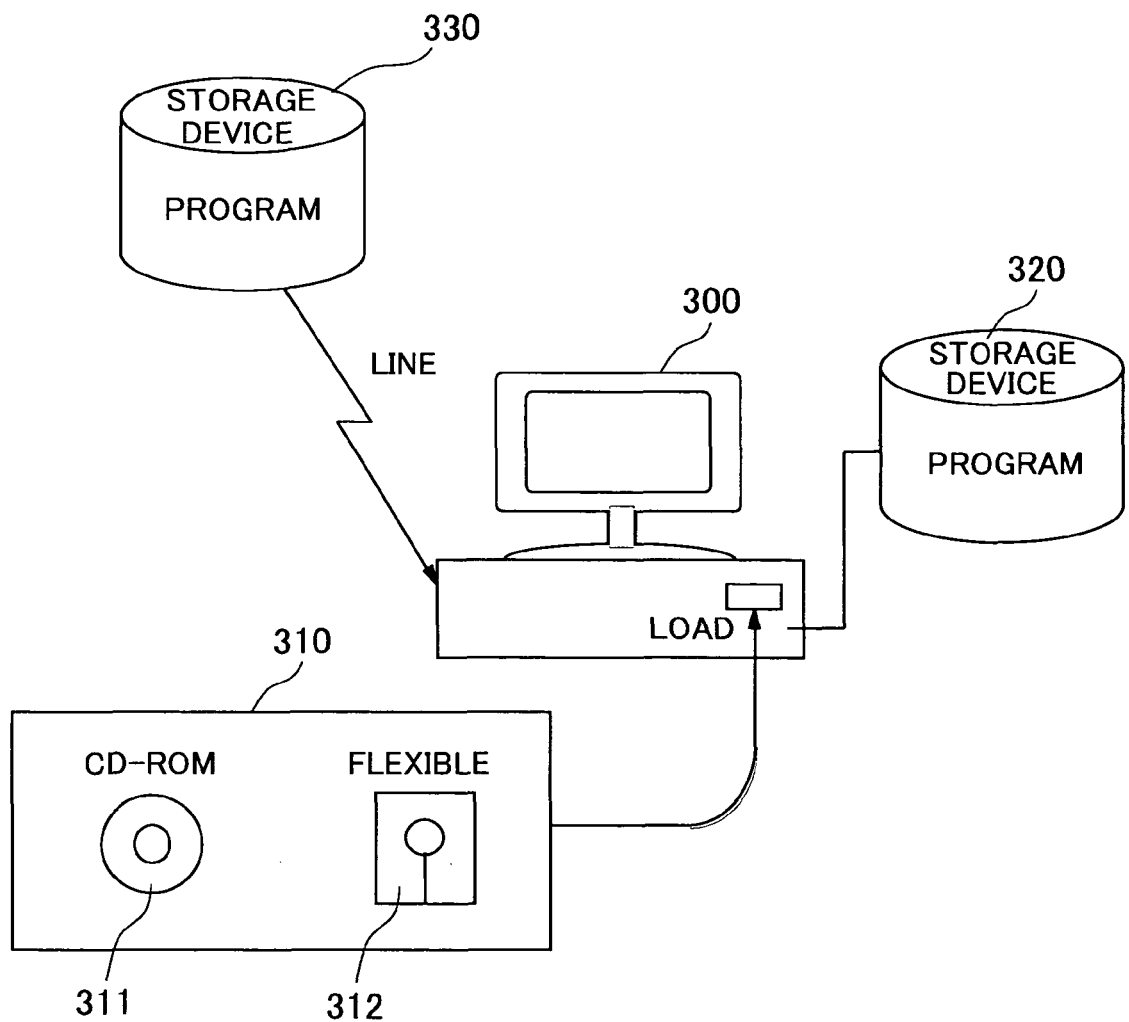
FIG. 16 is an explanatory drawing of a recording medium for storing the program in accordance with the present invention.

The above-described embodiments can be configured so that a program recorded on a hard disk, CD-ROM or other recording medium is expanded on a main memory and the computer is caused to function as functional units. In this case, the program for realizing the method for computing a conversion parameter of Montgomery modular multiplication in accordance with the present invention, as shown in FIG. 16, may be recorded on a portable recording medium 310 such as a CD-ROM 311 or flexible disk 312, another recording device 330 provided at the end of a communication circuit, or a recording medium 320 such as a hard disk or RAM of a computer 300 and may be loaded and executed on the main memory of the computer 300 during program execution.
  The present invention makes it possible to resolve the problems of a limitation relating to parameter v, calculation of the most significant bit (MSB) of data values, and detection of bit values of data and to increase the processing efficiency in software installation. As a result, the processing speed during processing of public key cryptography such as RSA and elliptic curve cryptography can be increased.
  The invention may be embodied in other forms without departing from the spirit or essential characteristics thereof. The embodiments disclosed in this application are to be considered in all aspects as illustrative and not limiting. The scope of the invention is indicated by the appended claims rather than by the foregoing description, and all changes which come within the meaning and range of equivalency of the claims are intended to be embraced therein.

What is claimed is:
  1. A non-transitory recording media having a computer program encoded therein that when executed causes a computer to execute a method for computing a conversion param- eter $R^2$ (mod n) of Montgomery modular multiplication wherein the effective word length of the residue modulo n is taken as m, the bit length per 1 word is taken as k, and $2^{m \times k}=R$, the executed method for computing a conversion parameter of Montgomery modular multiplication comprising:

a first operation for calculating $H_0=2^v \times R$ (mod n), wherein v is an integer, $v \geq 1$, and $(m \times k)/v$ is an integer, comprising:

an operation for initializing two registers REG1, REG2 by REG1=n, REG2=$2^{(m-1) \times k}$ wherein REG1 is a register composed of m words and REG2 is a register composed of m or more words, and an operation for obtaining $2^v \times R$ (mod n) by repeating k+v times a modular squaring computation employing the value of REG1 as a residue modulo with respect to REG2;

a second operation for calculating $H_p=2^{v \times 2^p} \times R$ (mod n) from $H_0=2^v \times R$ (mod n) by repeating $H_i=REDC(H_{i-1}, H_{i-1})_n$ with respect to i=1, 2 ... p, wherein (p represents an integer satisfying the condition $2^p \geq (m \times k)/v > 2^{p-1}$, REDC represents the Montgomery modular multiplication $REDC(a, b)_n = a \times b \times R^{-1}$ (mod n), and x^i represents exponential computation $x^i$; and a third operation for calculating $H_p=R^2$ (mod n) by calculating $H_p=REDC(H_p, g)_n$ with respect to $H_p$ obtained in the second operation when $2^p > (m \times k)/v$ and finally outputting $H_p$ as $R^2$ (mod n), wherein $g=2^{k \times E(p,m,k)}$ and $E(p, m, k)=2 \times m-(v \times 2^p)/k$.

2. A non-transitory recording media having a computer program encoded therein that when executed causes a computer to execute a method for computing a conversion parameter $R^2$ (mod n) of Montgomery modular multiplication wherein the effective word length of the residue modulo n is taken as m, the bit length per 1 word is taken as k, and $2^{m \times k}=R$, the executed method for computing a conversion parameter of Montgomery modular multiplication comprising:

a first operation for calculating H'=R (mod n), $H_0=2^v \times R$ (mod n), wherein v is an integer, v>1, and $(m \times k)/v$ is an integer; and a second operation for calculating and outputting H'=$R^2$ (mod n) by repeating the operations of:

calculating H'=REDC(H', $H_i)_n$ if the i-th bit value of $(m \times k)/v$ is 1, and calculating $H_i=REDC(H_{i-1}, H_{i-1})_n$ with respect to i=0, 1, ..., b-1, wherein b is a constant representing the highest-order bit length of $(m \times k)/v$ and REDC represents the Mongtomery modular multiplication REDC $(a, b)_{n=a \times b \times R}^{-1}$ (mod n);

wherein said first operation comprises:

initializing two registers REG1, REG2 by REG1:=n, REG2:=$2^{(m-1) \times k}$ wherein REG1 is a register composed of m words, REG2 is a register composed of m or more words, and k is a bit length per 1 word, calculating REG2=$2^{m \times k}$ (mod n)=R (mod n) by repeating k times a modular squaring computation employing the value of REG1 as a residue modulo with respect to REG2 and copying the calculation result to H', and calculating REG2=$2^v \times R$ (mod n) by further repeating the modular squaring computation v times with respect to REG2 and copying the calculation result to $H_0$.

3. A device for computing a conversion parameter $R^2$ (mod n) of Montgomery modular multiplication wherein the effective word length of the residue squaring n is taken as m, the bit length per 1 word is taken as k, and $2^{m \times k}=R$, the device comprising:

a processor;

a first register REG1 composed of m words;

a second register REG2 composed of m or more words;

an initialization processing unit in the processor for initializing the two registers REG1, REG2 by REG1=n, REG2=$2^{(m-1) \times k}$;

an $H_0$ computation unit in the processor for computing $H_0=2^v \times R$ (mod n) by repeating k+v times a modular squaring computation employing the value of the first register REG1 as a residue modulo with respect to the second register REG2, wherein v is an integer, $v \geq 1$, and $(m \times k)/v$ is an integer;

an $H_p$ computation unit in the processor for calculating $H_p=2^{v \times 2^p} \times R$ (mod n) from $H_0=2^v \times R$ (mod n) by repeating $H_i=REDC(H_{i-1}, H_{i-1})$ with respect to i=1, 2 ... p, wherein p represents an integer satisfying the condition $2^p \geq (m \times k)/v > 2^{p-1}$, REDC represents the Mongtomery modular multiplication $REDC(a, b)_n = a \times b \times R^{-1}$ (mod n), and x^i represents exponential computation $x^i$; and a parameter output unit in the processor for calculating $H_p=R^2$ (mod n) by calculating $H_p=REDC(H_p, g)_n$ with respect to $H_p$ obtained with the $H_p$ computation unit when $2^p > (m \times k)/v$, wherein $g=2^{k \times E(p,m,k)}$ and $E(p, m, k)=2 \times m-(v \times 2^p)/k$, and finally outputting $H_p$ as $R^2$ (mod n).

4. A device for computing a conversion parameter $R^2$ (mod n) of Montgomery modular multiplication wherein the effective word length of the residue squaring n is taken as m, the bit length per 1 word is taken as k, and $2^{m \times k}=R$, the device comprising:

a processor;

an $H_0$ computation unit in the processor for calculating H'=R (mod n), $H_0=2^v \times R$ (mod n), wherein v is an integer, $v \geq 1$, and $(m \times k)/v$ is an integer; and a H'0 computation unit in the processor for calculating and outputting H'=$R^2$ (mod n) by repeating a first operation for calculating H'=REDC(H', $H_i)_n$ if the i-th bit value of $(m \times k)/v$ is 1 and a second operation for calculating $H_i=REDC(H_{i-1}, H_{i-1})_n$ with respect to i=0, 1, ..., b-1, wherein b is a constant representing the highest-order bit length of $(m \times k)/v$ and REDC represents the Mongtomery modular multiplication computation REDC(a, b)$_n=a \times b \times R^{-1}$ (mod n);

wherein said first operation comprises:

initializing two registers REG1, REG2 by REG1:=n, REG2:=$2^{(m-1) \times k}$ wherein REG1 is a register composed of m words, REG2 is a register composed of m or more words, and k is a bit length per 1 word, calculating REG2=$2^{m \times k}$ (mod n)=R (mod n) by repeating k times a modular squaring computation employing the value of REG1 as a residue modulo with respect to REG2 and copying the calculation result to H', and calculating REG2=$2^v \times R$ (mod n) by further repeating the modular squaring computation v times with respect to REG2 and copying the calculation result to $H_0$.

* * * * *

UNITED STATES PATENT AND TRADEMARK OFFICE
CERTIFICATE OF CORRECTION

PATENT NO.         : 7,792,893 B2
APPLICATION NO.    : 11/230592
DATED              : September 7, 2010
INVENTOR(S)        : Kouichi Itoh et al.

It is certified that error appears in the above-identified patent and that said Letters Patent is hereby corrected as shown below:

Column 21, line 19 (Approx.), in claim 1, delete "(p" and insert -- p --, therefor.

Column 21, line 39 (Approx.), in claim 2, delete "v>1," and insert -- $v \geq 1$ --, therefor.

Column 21, line 48, in claim 2, delete "Mongtomery" and insert -- Montgomery --, therefor.

Column 21, line 49, in claim 2, delete "$(a, b)_{n=axbxR}^{-1}$" and insert -- $(a, b)_n = axbxR^{-1}$ --, therefor.

Column 22, line 20, in claim 3, delete "$H_{i-1})$" and insert -- $H_{i-1})_n$ --, therefor.

Column 22, line 22, in claim 3, delete "Mongtomery" and insert -- Montgomery --, therefor.

Column 22, line 33, in claim 4, delete "squaring" and insert -- modulo --, therefor.

Column 22, line 38, in claim 4, delete "$2^v \times R$" and insert -- $2^v \times R$ --, therefor.

Column 22, line 40, in claim 4, delete "H'0" and insert -- H' --, therefor.

Column 22, line 46-47, in claim 4, delete "Mongtomery" and insert -- Montgomery --, therefor.

Column 22, line 59, in claim 4, delete "$2^v \times R$" and insert -- $2^v \times R$ --, therefor.

Signed and Sealed this
Nineteenth Day of April, 2011

David J. Kappos
*Director of the United States Patent and Trademark Office*